US012686963B2

(12) United States Patent 
Seo et al.

(10) Patent No.: US 12,686,963 B2 
(45) Date of Patent: Jul. 21, 2026

(54) FILTER APPARATUS AND CLOTHES TREATING APPARATUS HAVING THE SAME

(71) Applicant: SAMSUNG ELECTRONICS CO., LTD., Suwon-si (KR)

(72) Inventors: Dongpil Seo, Suwon-si (KR); Youngjin Cho, Suwon-si (KR); Kanghyun Lee, Suwon-si (KR); Jaebok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 18/211,120

(22) Filed: Jun. 16, 2023

(65) Prior Publication Data

US 2024/0052548 A1 Feb. 15, 2024

Related U.S. Application Data

(63) Continuation of application No. PCT/KR2023/006973, filed on May 23, 2023.

(30) Foreign Application Priority Data

| | | |
|---|---|---|
| Aug. 9, 2022 | (KR) | 10-2022-0099533 |
| Dec. 22, 2022 | (KR) | 10-2022-0182342 |

(51) Int. Cl.
*D06F 39/10* (2006.01)
*B01D 29/35* (2006.01)
(Continued)

(52) U.S. Cl.
CPC ............. *D06F 39/10* (2013.01); *B01D 29/35* (2013.01); *B01D 29/6476* (2013.01);
(Continued)

(58) Field of Classification Search
CPC .......... D06F 33/43; D06F 35/30; D06F 39/10; D06F 39/082; D06F 2103/42;
(Continued)

(56) References Cited

U.S. PATENT DOCUMENTS 7,412,853 B2 8/2008 Hong et al.
2017/0101734 A1 4/2017 Jung et al.
(Continued)

FOREIGN PATENT DOCUMENTS

CN 109423858 A 3/2019
CN 111714938 A * 9/2020 ............. B01D 24/10
(Continued)

OTHER PUBLICATIONS

Machine Translation of Wendel et al., CN-111714938-A, Sep. 2020. (Year: 2020).*
(Continued)

*Primary Examiner* — David G Cormier 
(74) *Attorney, Agent, or Firm* — STAAS & HALSEY LLP

(57) ABSTRACT

A filter apparatus positionable outside a washing machine and connectable to a drain device of the washing machine, the filter apparatus including a filter case including a case inlet configured so that, with the filter apparatus connected to the drain device, water from the drain device is flowable through the case inlet into the filter case, and a case outlet configured so that, with the filter apparatus connected to the drain device, water in the filter case is flowable through the case outlet out of the filter case; a filter detachably mountable inside the filter case so that water flowing through the case inlet is flowable through a surface of the filter to filter foreign substances from the water, and then to the case (Continued)

outlet; a filter cleaning device configured to clean the surface of the filter; and a controller configured to control the filter cleaning device.

15 Claims, 19 Drawing Sheets

(51) Int. Cl.

| | |
|---|---|
| *B01D 29/64* | (2006.01) |
| *B01D 29/96* | (2006.01) |
| *B01D 35/147* | (2006.01) |
| *B01D 35/30* | (2006.01) |
| *D06F 33/43* | (2020.01) |
| *D06F 39/08* | (2006.01) |
| *D06F 103/42* | (2020.01) |
| *D06F 105/34* | (2020.01) |

(52) U.S. Cl.

CPC ........... *B01D 29/96* (2013.01); *B01D 35/147* (2013.01); *B01D 35/30* (2013.01); *D06F 33/43* (2020.02); *D06F 39/083* (2013.01); *B01D 2201/325* (2013.01); *B01D 2201/58* (2013.01); *D06F 2103/42* (2020.02); *D06F 2105/34* (2020.02)

(58) Field of Classification Search

CPC ............. D06F 2105/08; D06F 2105/34; B01D 29/6476; B01D 35/147

See application file for complete search history.

(56) References Cited

U.S. PATENT DOCUMENTS

| | | | |
|---|---|---|---|
| 2020/0270795 A1* | 8/2020 | Zarcone | .................. D06F 34/22 |
| 2022/0008845 A1 | 1/2022 | Girondi | |
| 2022/0228310 A1 | 7/2022 | Cho et al. | |
| 2023/0078618 A1* | 3/2023 | Becchio | ............... B01D 29/606 |
| | | | 210/107 |

FOREIGN PATENT DOCUMENTS

| | | | |
|---|---|---|---|
| CN | 216129840 U | 3/2022 | |
| CN | 114717815 A | 7/2022 | |
| CN | 114808397 A | 7/2022 | |
| JP | 2009-89947 A | 4/2009 | |
| JP | 2014-212821 A | 11/2014 | |
| JP | 2015-116296 A | 6/2015 | |
| JP | 2020-195502 A | 12/2020 | |
| KR | 20-0157098 Y1 | 9/1999 | |
| KR | 10-0700793 B1 | 3/2007 | |
| KR | 10-2021-0090193 A | 7/2021 | |
| KR | 10-2022-0103280 A | 7/2022 | |
| WO | WO 2018/086931 A1 | 5/2018 | |
| WO | WO 2021/070102 A1 | 4/2021 | |
| WO | WO 2021/079226 A1 | 4/2021 | |
| WO | WO 2023/237200 A1 | 12/2023 | |

OTHER PUBLICATIONS

International Search Report dated Sep. 4, 2023 for International Application No. PCT/KR2023/006973.
Written Opinion of International Searching Authority dated Sep. 4, 2023 for International Application No. PCT/KR2023/006973.
Extended European Search Report dated Jul. 4, 2025 for European Application No. 23852686.7.

* cited by examiner

FILTER APPARATUS AND CLOTHES TREATING APPARATUS HAVING THE SAME

CROSS-REFERENCE TO RELATED APPLICATIONS

This application is a continuation application, filed under 35 U.S.C. § 111(a), of International Application PCT/KR2023/006973 filed on May 23, 2023, and is based on and claims priority under 35 U.S.C. § 119 to Korean Patent Applications No. 10-2022-0099533, filed on Aug. 9, 2022, and No. 10-2022-0182342, filed on Dec. 22, 2022, in the Korean Intellectual Property Office, the disclosures of which are incorporated by reference herein in their entireties.

BACKGROUND

1. Field

The present disclosure relates to a filter apparatus connectable to a washing machine and clothes treating apparatus having the filter apparatus.

2. Description of the Related Art

A washing machine is an apparatus for washing laundry put inside of the tub through friction by stirring the laundry, water, and a detergent together by using a driving force of a driving motor.

Operations that are performed by the washing machine include, regardless of the type of the washing machine, a washing operation for washing laundry put into the tub by supplying a detergent and water to the tub and rotating the drum, a rinsing operation for rinsing the laundry by supplying water to the tub and rotating the drum, and a dehydrating operation for dehydrating water of the laundry by discharging water from the tub and rotating the drum.

The washing machine includes a drain device configured to discharge water stored in the tub to the outside of the washing machine while performing the washing operation, the rinsing operation, and/or the dehydrating operation. The drain device is configured to again discharge water discharged from the tub to the tub while performing the washing operation and/or the rinsing operation.

SUMMARY

Aspects of embodiments of the disclosure will be set forth in part in the description which follows and, in part, will be apparent from the description, or may be learned by practice of the presented embodiments.

According to an embodiment of the disclosure, a filter apparatus may be positionable outside a washing machine and connectable to a drain device of the washing machine, and the filter apparatus may include a filter case including a case inlet configured so that, with the filter apparatus connected to the drain device, water from the drain device is flowable through the case inlet into the filter case, and a case outlet configured so that, with the filter apparatus connected to the drain device, water in the filter case is flowable through the case outlet out of the filter case; a filter detachably mountable inside the filter case so that water flowing through the case inlet is flowable through a surface of the filter to filter foreign substances from the water, and then to the case outlet; a filter cleaning device configured to clean the surface of the filter; and a controller configured to control the filter cleaning device to clean the surface of the filter.

According to an embodiment of the disclosure, the filter cleaning device includes a cleaning driving device including a cleaning motor, and a cleaning member configured to be rotated in contact with the surface of the filter while the filter is mounted inside the filter case, wherein the cleaning driving device is configured to drive rotation of the cleaning member with power generated by the cleaning motor.

According to an embodiment of the disclosure, the cleaning member is configured to, while the filter is mounted inside the filter case, transfer foreign substances filtered in a portion of the filter close to the case inlet to a portion of the filter close to the case outlet while the rotation of the cleaning member is driven by the cleaning driving device.

According to an embodiment of the disclosure, the filter case includes a remaining water guide inclined downward from the case outlet toward case inlet.

According to an embodiment of the disclosure, the remaining water guide is positioned below the filter while the filter is mounted inside the filter case.

According to an embodiment of the disclosure, the filter apparatus further includes a connecting hole arranged in the filter case to discharge water guided by the remaining water guide toward the case inlet; and a connecting door configured to open and close the connecting hole.

According to an embodiment of the disclosure, the filter apparatus further includes a filtering flow path passing through the filter while the filter is mounted inside the filter case; a bypass flow path bypassing the filter while the filter is mounted inside the filter case; a connecting hole formed to allow water from the bypass flow path to move to the case inlet and to allow water flowing through the case inlet to move to the bypass flow path; and a connecting door configured to open and close the connecting hole.

According to an embodiment of the disclosure, the controller controls the connecting door to open the connecting hole based on a determination that the filter is clogged.

According to an embodiment of the disclosure, the controller controls the connecting door to open the connecting hole based on a determination that an inflow of water through the case inlet is stopped.

According to an embodiment of the disclosure, the filter apparatus further includes a circuitry positioned above the filter while the filter is mounted inside the filter case, wherein the controller is arranged in the circuitry.

According to an embodiment of the disclosure, the filter apparatus further includes a user interface device positioned above the circuitry.

According to an embodiment of the disclosure, the filter case includes a case opening through which the filter is passable to be mounted inside the filter case, and which is positioned closer to the case outlet than the case inlet.

According to an embodiment of the disclosure, the cleaning driving device is positioned closer to the case inlet than the case outlet.

According to an embodiment of the disclosure, the filter apparatus further includes a handle detachably couplable to the filter.

According to an embodiment of the disclosure, a clothes treating apparatus may include a washing machine including a washing machine housing, a tub inside the washing machine housing, and a drain device configured to discharge water from the tub to outside of the washing machine housing; and a filter apparatus disposed outside the washing machine housing and connected to the drain device, the filter apparatus including a filter case including a case inlet configured so that water from the drain device is flowable through the case inlet into the filter case, a case outlet configured so that water in the filter case is flowable through the case outlet out of the filter case, and a remaining water guide configured to be inclined downward from the case outlet toward the case inlet; a filter detachably mountable inside the filter case so that water flowing through the case inlet is flowable through a surface of the filter to filter foreign substances from the water, and then to the case outlet; and a circuitry including a controller configured to control the filter apparatus, and a power supply part configured to receive power to power the filter apparatus, wherein the remaining water guide is positioned below the filter while the filter is mounted inside the filter case.

According to an embodiment of the disclosure, the surface of the filter is configured to filter foreign substances having a size of 5 mm or less from the water flowing through the surface of the filter.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
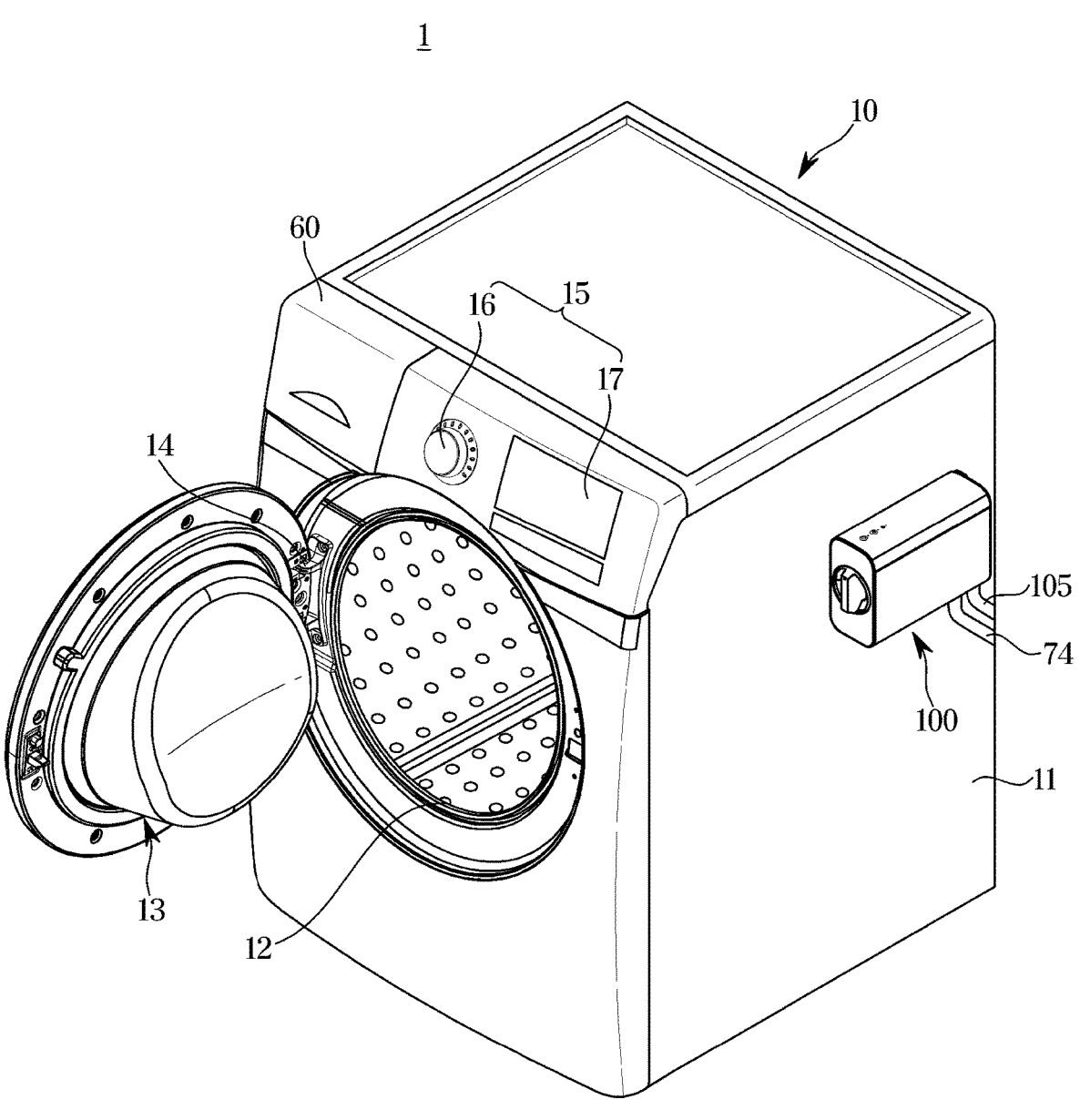
FIG. 1 shows a clothes treating apparatus according to an embodiment of the disclosure.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

The term "and/or" includes any and all combinations of one or more of associated listed items.

As used herein, such terms as "1st" and "2nd," or "first" and "second" may be used to simply distinguish a corresponding component from another, and does not limit the components in other aspect (for example, importance or order).

It is to be understood that if a certain component (for example, a first component) is referred to, with or without the term "operatively" or "communicatively", as "coupled with," "coupled to," "connected with," or "connected to" another component (for example, a second component), it means that the component may be coupled with the other component directly (for example, wiredly), wirelessly, or via a third element.

It is to be understood that the terms such as "including" or "having," etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

It is to be understood that if a certain component is referred to as being "coupled with," "coupled to," "supported on" or "in contact with" another component, it means that the component may be coupled with the other component directly or indirectly via a third component.

It will also be understood that when a certain component is referred to as being "on" or "over" another component, it can be directly on the other component or intervening components may also be present.

A washing machine, according to various embodiments, may perform washing, rinsing, draining, and dehydrating operations. A washing machine may also be a drying combination washing machine capable of performing a drying operation on the dehydrated laundry. A washing machine may be an example of a clothes treating apparatus. The clothes treating apparatus is a concept that includes a device for washing clothes (objects to be washed or dried), a device for drying clothes, and a device capable of washing and drying clothes.

The washing machine according to various embodiments of the disclosure may include a top-loading washing machine, wherein an inlet through which laundry is put into the top-loading washing machine is provided upward, or a front-loading washing machine, wherein an inlet through which laundry is put into the front-loading washing machine is provided forward. The washing machine according to various embodiments of the disclosure may include another loading type of washing machine, other than the top-loading washing machine and the front-loading washing machine.

The top-loading washing machine may wash laundry by using water streams generated by a rotating body such as a pulsator. The front-loading washing machine may wash laundry by rotating a drum to repeatedly raise and drop the laundry. The front-loading washing machine may include a lift for raising laundry. The front-loading washing machine may include a drying combination washing machine capable of drying laundry stored in a drum. The drying combination washing machine may include a heating device for high-temperature air. The drying combination washing machine may further include a condensing device for dry air. For example, the drying combination washing machine may include a heat pump. The washing machine according to various embodiments of the disclosure may include a washing machine using another washing method, other than a washing machine using the above-described washing method.

Embodiments of the disclosure may provide a filter apparatus and a clothes treating apparatus having the filter apparatus that is easy to manage. Embodiments of the disclosure may provide a filter apparatus and a clothes treating apparatus having the filter apparatus capable of increasing a filter replacement cycle. Embodiments of the disclosure may provide a filter apparatus and a clothes treating apparatus having the filter apparatus capable of preventing contamination of the surroundings of the filter apparatus while managing the filter. Embodiments of the disclosure may provide a filter apparatus and a clothes treating apparatus having the filter apparatus capable of discharging water from the filter apparatus even if a portion of the filter is clogged. Embodiments of the disclosure may provide a filter apparatus and a clothes treating apparatus having the filter apparatus capable of preventing the operation of the filter apparatus from being stopped even if a portion of the filter is clogged.

Technical objects of the disclosure are not limited to those described above, and other technical objects not described herein will also be clearly understood by a person who has a common knowledge in the technical field to which the disclosure pertains from the following detailed description.

Hereinafter, a washing machine according to various embodiments of the disclosure will be described in detail with reference to the accompanying drawings.

Figure 2:
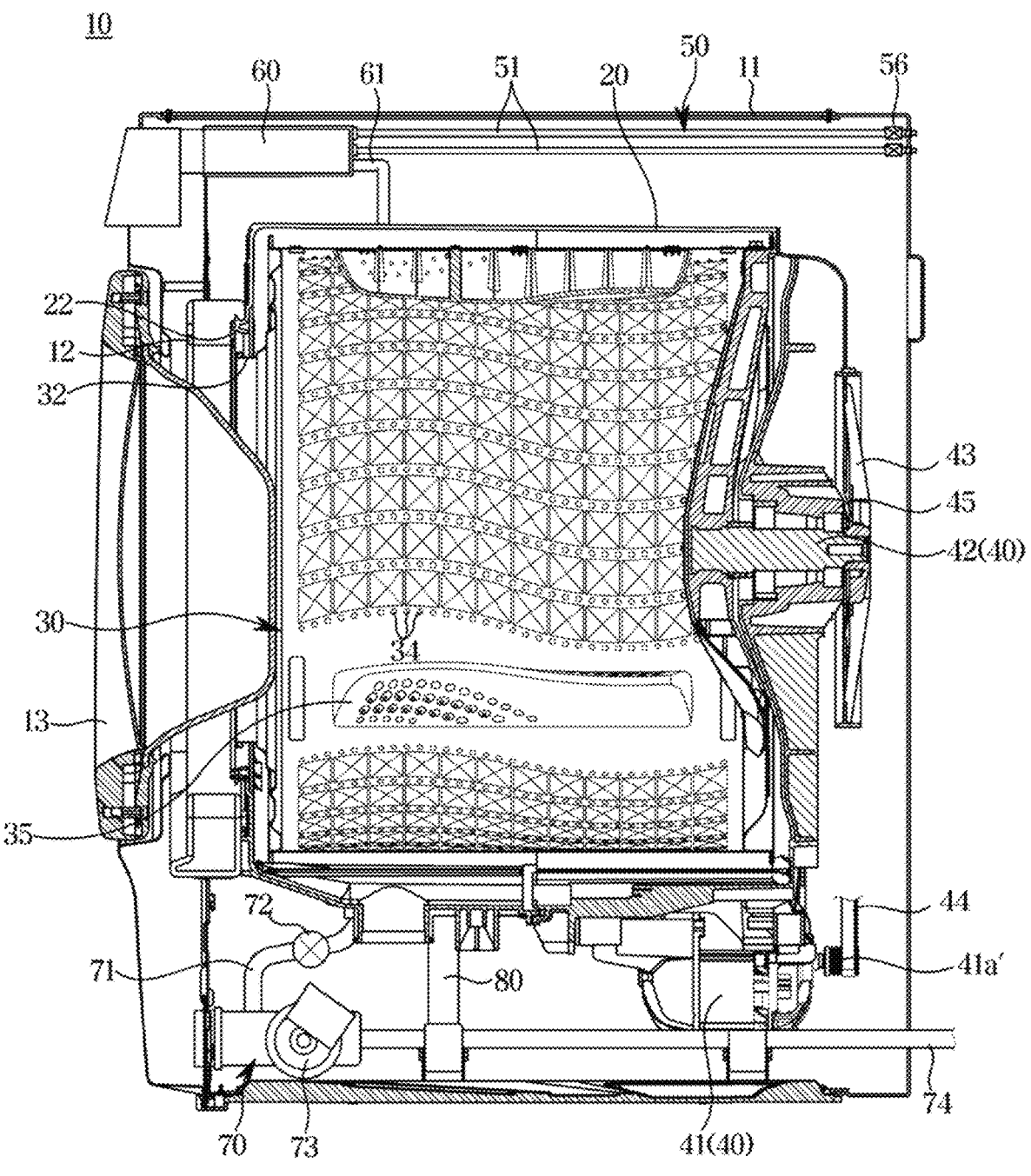
FIG. 2 shows a cross section of a washing machine shown in FIG. 1 according to an embodiment of the disclosure.

FIG. 1 shows a clothes treating apparatus according to an embodiment of the disclosure. FIG. 2 shows a cross section of a washing machine, shown in FIG. 1.

Referring to FIGS. 1 and 2, the washing machine 10 of the clothes treating apparatus 1 may include a washing machine housing 11 accommodating various components therein. The washing machine housing 11 may form an exterior of the washing machine 10. The washing machine housing 11 may have the shape of a box that is at least partially open.

The washing machine housing 11 may include a housing opening 12 for allowing an access to inside of a drum 30. The housing opening 12 may open approximately forward.

The washing machine 10 may include a door 13 for opening or closing the housing opening 12 provided in the washing machine housing 11. The door 13 may be rotatably mounted on the washing machine housing 11 by a hinge 14. At least one portion of the door 13 may be transparent or translucent to show the inside of the washing machine housing 11.

The washing machine 10 may include a tub 20 provided inside the washing machine housing 11 to store water. The tub 20 may be disposed inside the washing machine housing 11. The tub 20 may include a tub opening 22 provided to correspond to the housing opening 12. The tub opening 22 may open substantially forward. The tub 20 may be supported on an inner surface of the washing machine housing 11. The tub 20 may have a substantially cylindrical shape of which one side opens.

The tub 20 may be elastically supported from the washing machine housing 11 by a damper 80. The damper 80 may connect the tub 20 to the washing machine housing 11. While vibrations generated according to a rotation of the drum 30 are transferred to the tub 20 and/or the washing machine housing 11, the damper 80 may absorb vibration energy between the tub 20 and the washing machine housing 11 to attenuate the vibrations.

The washing machine 10 may include the drum 30 accommodating laundry. The drum 30 may be rotatably provided inside the tub 20. The drum 30 may perform washing, rinsing, and/or dehydrating while rotating inside the tub 20. The drum 30 may include a through hole 34 that connects an inside space of the drum 30 to an inside space of the tub 20. The drum 30 may have a substantially cylindrical shape of which one side opens. On an inner circumferential surface of the drum 30, at least one lifter 35 may be provided to raise and drop laundry according to a rotation of the drum 30.

The drum 30 may include a drum opening 32 corresponding to the housing opening 12 and the tub opening 22. Laundry may be put into or withdrawn from the drum 30 through the housing opening 12, the tub opening 22, and the drum opening 32.

The washing machine 10 may include a washing machine driver 40 configured to rotate the drum 30. The washing machine driver 40 may include a driving motor 41, and a rotating shaft 42 for transferring a driving force generated in the driving motor 41 to the drum 30. The rotating shaft 42 may penetrate the tub 20 and be connected to the drum 30.

The washing machine 10 may be divided into a direct drive type in which the rotating shaft 42 is directly connected to the driving motor 41 to rotate the drum 30, and an indirect drive type in which a pulley 43 is connected between the driving motor 41 and the rotating shaft 42 to drive the drum 30.

The washing machine 10 according to an embodiment may be arranged as an indirect drive type, but may also be arranged as a direct drive type, without being limited thereto.

One end of the rotating shaft 42 may be connected to the drum 30, and another end of the rotating shaft 42 may be connected to the pulley 43 to obtain a driving force from the driving motor 41. A motor pulley 41a' may be formed on the rotating axis of the driving motor 41. A driving belt 44 is provided between the motor pulley 41a' and the pulley 43 so that the rotating shaft 42 may be driven by the driving belt 44.

In the rear portion of the tub 20, a bearing housing 45 may be installed to rotatably support the rotating shaft 42. The bearing housing 45 may be made of an aluminum alloy and may be inserted into the rear portion of the tub 20 upon injection-molding of the tub 20.

The washing machine driver 40 may be provided to perform washing, rinsing, and/or dehydration or drying operations by rotating the drum 30 forwardly or reversely.

The washing machine 10 may include a water supply device 50. The water supply device 50 may supply water to the tub 20. The water supply device 50 may be located above the tub 20. The water supply device 50 may include a water supply pipe 51, and a water supply valve 56 provided in the water supply pipe 51. The water supply pipe 51 may be connected to an external water supply source. The water supply pipe 51 may extend to a detergent supply device 60 and/or the tub 20 from the external water supply source. Water may be supplied to the tub 20 via the detergent supply device 60. Water may be supplied to the tub 20 not via the detergent supply device 60.

The water supply valve 56 may open or close the water supply pipe 51 in response to an electrical signal from a controller 90. The water supply valve 56 may allow or block supply of water from the external water supply source to the tub 20. The water supply valve 56 may include, for example, a solenoid valve that is opened or closed in response to an electrical signal.

The washing machine 10 may include the detergent supply device 60 configured to supply a detergent to the tub 20. The detergent supply device 60 may supply a detergent to the inside of the tub 20 during a water supply process. Water supplied through the water supply pipe 51 may be mixed with a detergent via the detergent supply device 60. The water mixed with the detergent may be supplied to the inside of the tub 20. The detergent may include a conditioner for dryer, a deodorant, a sterilizer, or an air freshener, as well as a washing detergent. The detergent supply device 60 may be connected to the tub 20 through a connection pipe 61.

The washing machine 10 may include a drain device 70. The drain device 70 may be configured to discharge water accommodated in the tub 20 to outside. The drain device 70 may include a drain pump 73 for discharging water from the tub 20 to the outside of the washing machine housing 11, a connection hose 71 connecting the tub 20 and the drain pump 73 so that water inside the tub 20 flows into the drain pump 73, and a drain hose 74 for guiding water pumped by the drain pump 73 to the outside of the washing machine housing 11. The drain device 70 may include a drain valve 72 provided on the connection hose 71 to open and close the connection hose 71.

The washing machine 10 may provide a user interface device 15 for interaction between the user and the washing machine 10.

The washing machine 10 may include at least one user interface device 15. The user interface device 15 may include at least one input interface 16 and at least one output interface 17.

At least one input interface 16 may convert sensory information received from a user into an electrical signal.

At least one input interface 16 may include a power button, an operation button, a course selection dial (or a course selection button), and a washing/rinsing/dehydrating setting button. At least one input interface 16 may include, for example, a tact switch, a push switch, a slide switch, a toggle switch, a micro switch, a touch switch, a touch pad, a touch screen, a jog dial, and/or microphone, etc.

At least one output interface 17 may transmit various data related to the operation of the washing machine 10 to the user by generating sensory information.

For example, at least one output interface 17 may transmit information related to a washing course, an operating time of the washing machine 10, and washing setting/rinsing setting/spinning setting to the user. Information on the operation of the washing machine 10 may be output through a screen, indicator, or voice. At least one output interface 17 may include, for example, a Liquid Crystal Display (LCD) panel, a Light Emitting Diode (LED) panel, a speaker, etc.

The clothes treating apparatus 1 may include a filter apparatus 100 provided to be connectable to the drain device 70 of the washing machine 10. The filter apparatus 100 may be disposed outside the washing machine 10. The filter apparatus 100 may be provided to filter foreign substances from water discharged from the washing machine 10. The filter apparatus 100 may be provided to filter foreign substances having a size smaller than that of foreign substances filterable by the washing machine 10. For example, the filter apparatus 100 may be provided to filter foreign substances having a size smaller than that of foreign substances filterable by the drain device 70 of the washing machine 10.

Figure 3:
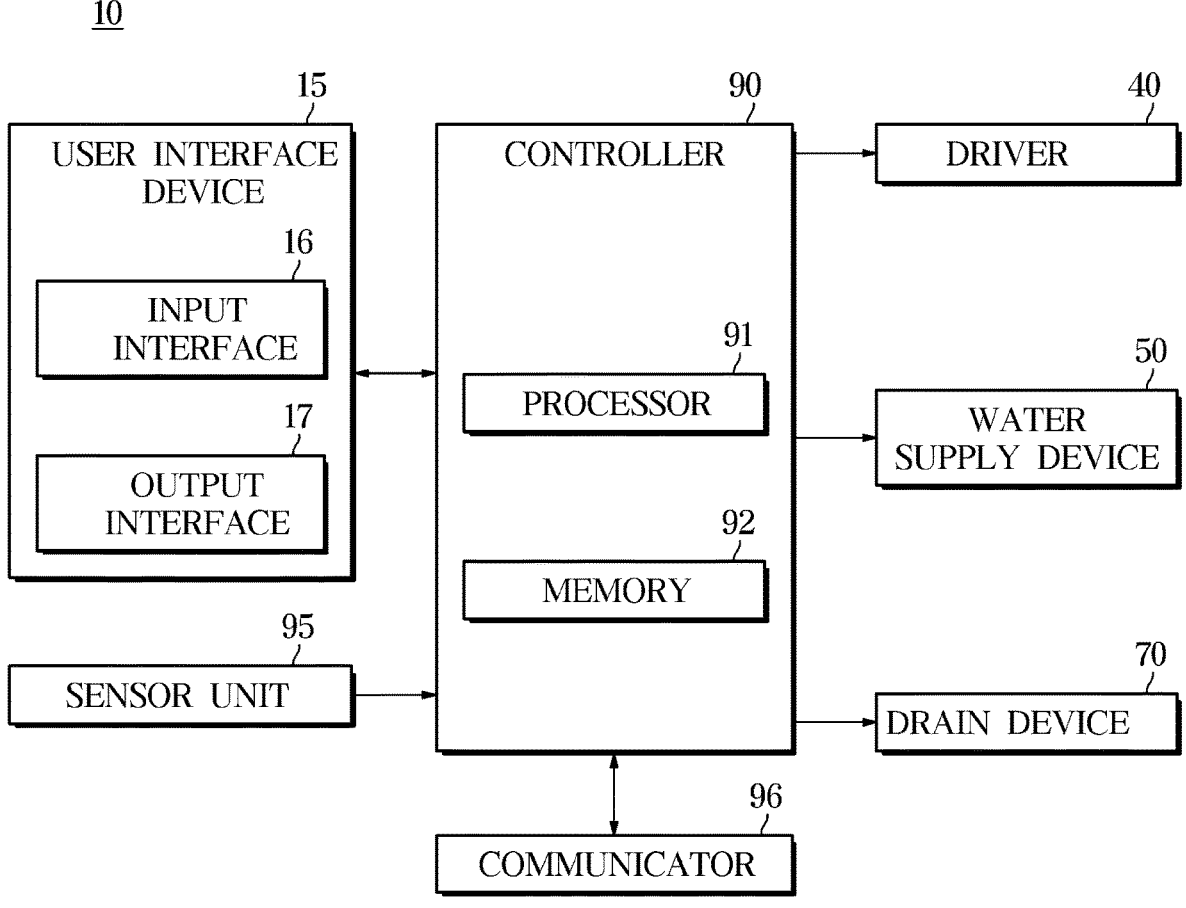
FIG. 3 is a control block diagram of a washing machine according to an embodiment of the disclosure.

FIG. 3 is a control block diagram of a washing machine according to an embodiment of the disclosure.

In an embodiment, the washing machine 10 may include a user interface device 15, a driver 40, a water supply device 50, a drain device 70, a sensor unit 95, a communicator 96, and a controller 90.

The user interface device 15 may provide a user interface for interacting with the user and the washing machine 10.

The user interface device 15 may include at least one input interface 16 and at least one output interface 17.

The at least one input interface 16 may convert sensory information received from the user into electrical signals.

At least one input interface 16 may include a power button, an operation button, a course selection dial (or a course selection button), and a washing/rinsing/dehydrating setting button. At least one input interface 16 may include, for example, a tact switch, a push switch, a slide switch, a toggle switch, a micro switch, a touch switch, a touch pad, a touch screen, a jog dial, and/or microphone, etc.

At least one output interface 17 may transmit various data related to the operation of the washing machine 10 to the user by generating sensory information.

For example, at least one output interface 17 may transmit information related to a washing course, an operating time of the washing machine 10, and washing setting/rinsing setting/spinning setting to the user. Information on the operation of the washing machine 10 may be output through a screen, indicator, or voice. At least one output interface 17 may include, for example, a Liquid Crystal Display (LCD) panel, a Light Emitting Diode (LED) panel, a speaker, etc.

The driver 40 may include the driving motor 41 that provides driving force to rotate the drum 30. The driver 40 may operate based on a control signal from the controller 90.

The water supply device 50 may include the water supply valve 56 for opening and closing a water supply pipe 51 extending from an external water source to the detergent supply device 60 and/or the tub 20. The water supply valve 56 may be opened and closed based on a control signal from the controller 90.

The drain device 70 may include the drain pump 73 for discharging water from the tub 20 to the outside of the washing machine housing 11. The drain pump 73 may operate based on a control signal of the controller 90.

The sensor unit 95 may include at least one sensor that obtains information related to the operating state of the washing machine 10.

For example, the sensor unit 95 may include at least one of a water level sensor for detecting the water level of the tub, a sensor for detecting the operating state of the driver 40, a flow sensor for detecting a flow rate flowing into the tub 20 through the water supply device 50, or a sensor for detecting an operating state of the drain device 70.

The sensor for detecting the operating state of the driver 40 may include, for example, a current sensor for measuring the driving current applied to the driving motor 41, but is not limited thereto.

The sensor for detecting the operating state of the drain device 70 may include, for example, a current sensor for measuring the driving current applied to the drain pump 73, but is not limited thereto.

The washing machine 10 may include a communicator 96 for wired and/or wireless communication with an external device.

The communicator 96 may include at least one of a short-distance communication module and a long-distance communication module.

The communicator 96 may transmit data to an external device (e.g., a server, user device, home appliance, and/or filter apparatus 100) or receive data from the external device. For example, the communicator 96 may establish communication with a server and/or user device and/or home appliance and transmit/receive various data.

For this, the communicator 96 may establish a direct (wired) communication channel or a wireless communication channel with an external electronic device (for example, a server, a user terminal, and/or a home appliance), and support communication through the established communication channel. According to an embodiment of the disclosure, the communicator 96 may include a wireless communicator (for example, a cellular communicator, a short-range wireless communicator, or a global navigation satellite system (GNSS) communicator), or a wired communicator (for example, a local area network (LAN) communicator or a power line communicator). A corresponding communicator among the communicators may communicate with an external electronic device through a first network (for example, a short-range communication network, such as Bluetooth, wireless fidelity (WiFi) direct, or infrared data association (IrDA)) or a second network (for example, a telecommunication network, such as a legacy cellular network, a 5G network, a next-generation communication network, internet, or a computer network (for example, a local area network (LAN) or a wide area network (WAN)). Such various kinds of communicators may be integrated into a component (for example, a single chip) or implemented as a plurality of independent components (for example, a plurality of chips).

A short-range wireless communicator may include a Bluetooth communicator, a Bluetooth Low Energy (BLE) communicator, a near field communicator (Near Field Communicator), a WLAN (Wi-Fi) communicator, a Zigbee communicator, an infrared data association (IrDA) communicator, a Wi-Fi Direct (WFD) communicator, an ultrawideband (UWB) communicator, an Ant+ communicator, a microwave (uWave) communicator or the like, but is not limited thereto.

The remote communicator may include a communicator that performs various types of long-distance communication, and may include a mobile communication unit.

In an embodiment, the communicator may communicate with an external device such as a server, user device, or other home appliance through a nearby access point (AP). The access point (AP) may connect a local area network (LAN) to which the washing machine 10 or user device is connected to a wide area network (WAN) to which a server is connected. The washing machine 10 or user device may be connected to the server through a wide area network (WAN). The controller 90 may control various components (e.g., the driver 40 and the water supply device 50) of the washing machine 10. The controller 90 may control various components of the washing machine 10 to perform at least one operation including water supply, washing, rinsing, and/or dehydrating according to a user input. For example, the controller 90 may control the driving motor 41 to adjust the rotational speed of the drum 30 or the water supply valve 56 of the water supply device 50 to supply water to the tub 20.

The controller 90 may include hardware such as a CPU or memory, and software such as a control program. For example, the controller 90 may include an algorithm for controlling the operation of components in the washing machine 10, at least one memory 92 that stores data in the form of a program, and at least one processor 91 that performs the above-described operation using data stored in at least one memory. The memory 92 and the processor 91 may be implemented as separate chips. The processor 91 may include one or more processor chips or may include one or more processing cores. The memory 92 may include one or more memory chips or may include one or more memory blocks. Also, the memory 92 and the processor 91 may be implemented as a single chip.

Figure 4:
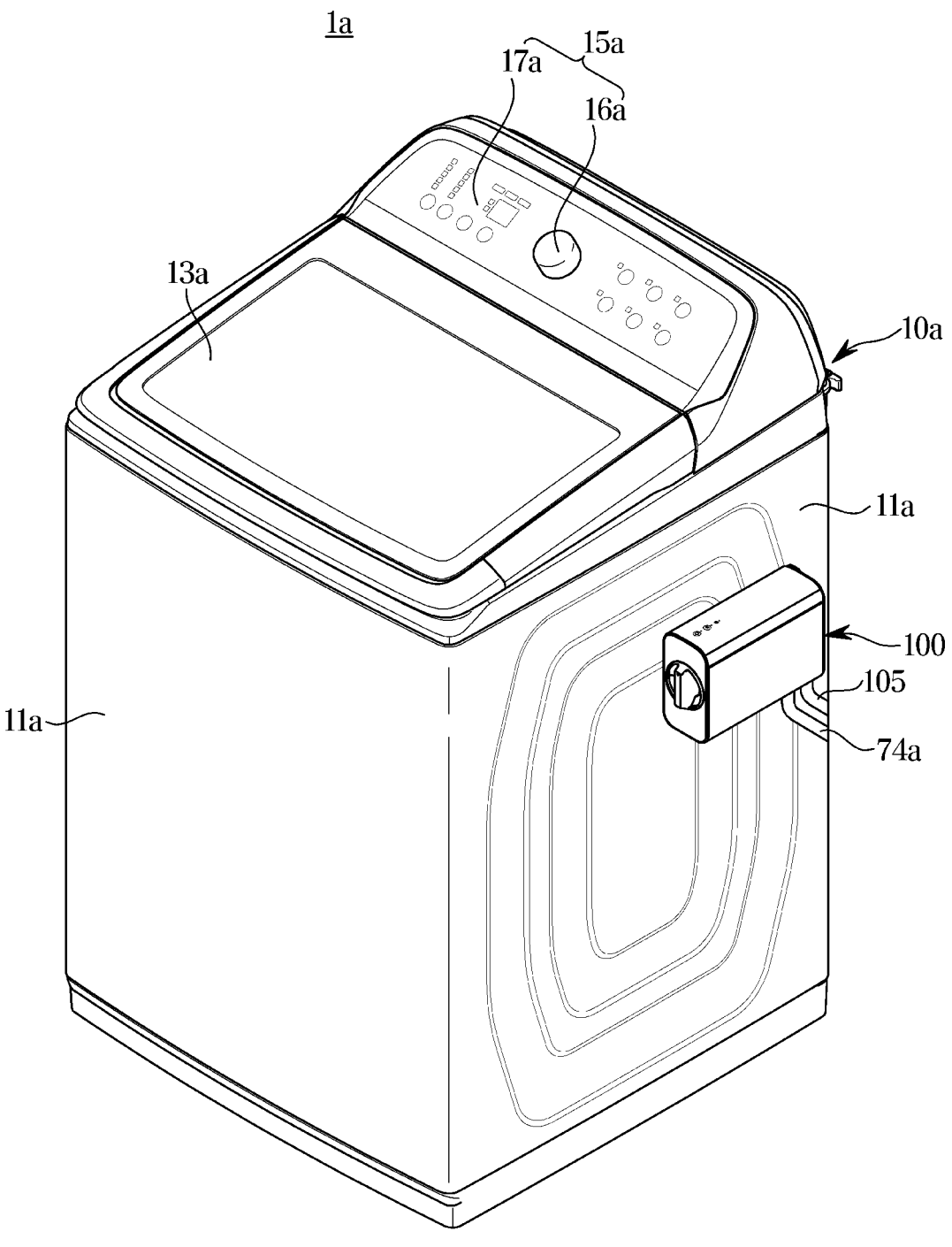
FIG. 4 shows a clothes treating apparatus according to an embodiment of the disclosure.
Figure 5:
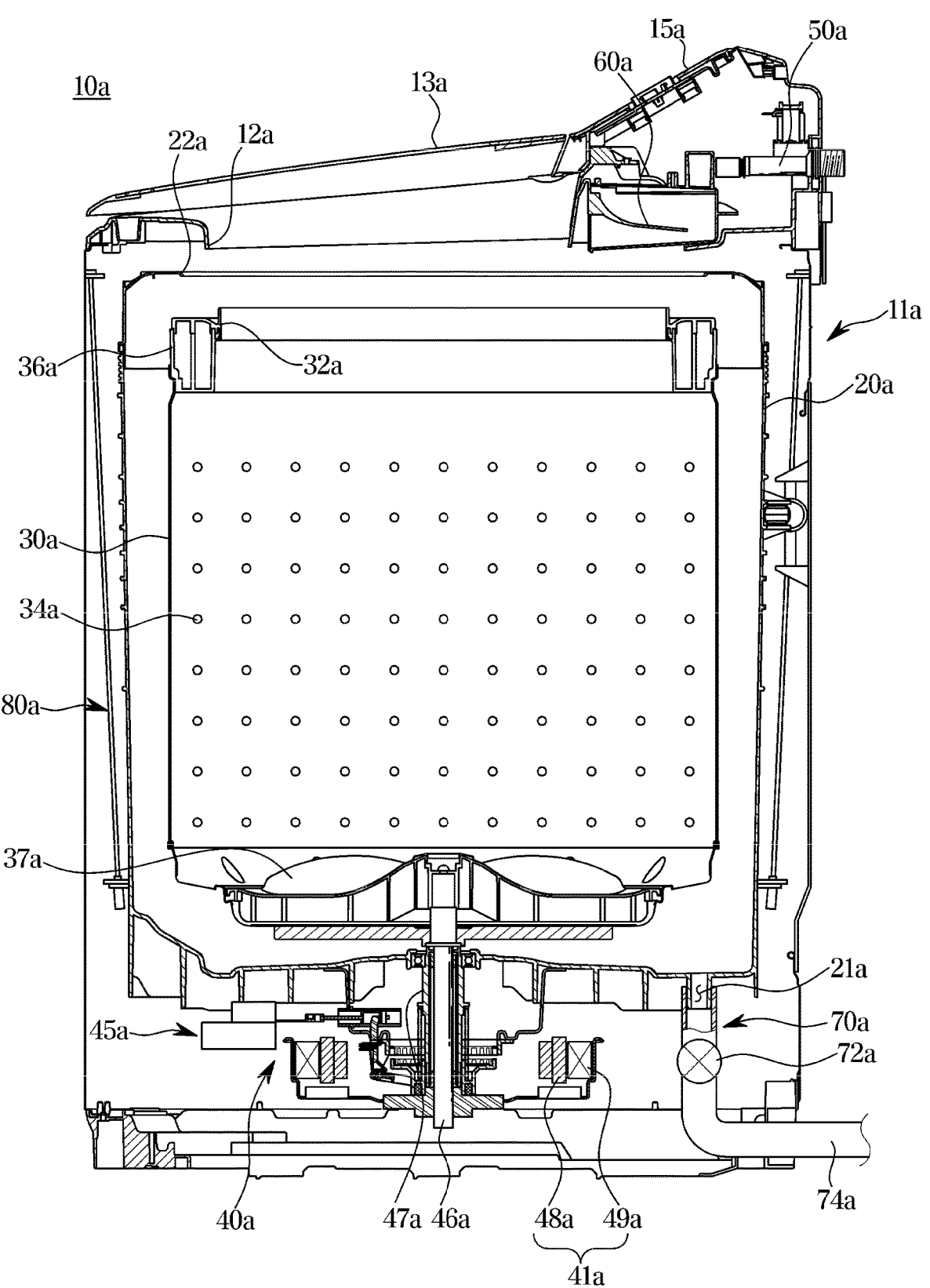
FIG. 5 shows a cross section of a washing machine shown in FIG. 4 according to an embodiment of the disclosure.

FIG. 4 shows a clothes treating apparatus according to an embodiment of the disclosure. FIG. 5 shows a cross section of a washing machine, shown in FIG. 4.

As shown in FIGS. 4 and 5, the washing machine 10a of the clothes treating apparatus 1a may include a housing 11a accommodating various components therein. The housing 11a may form an exterior of the washing machine 10a. The housing 11a may have a box shape with one part open.

The housing 11a may include a housing opening 12a formed to be accessible to the inside of a drum 30a. The housing opening 12a may open substantially upward.

The washing machine 10a may include a door 13a for opening and closing the housing opening 12a provided in the housing 11a. The door 13a may be rotatably mounted to the housing 11a by a hinge. At least a portion of the door 13a may be transparent or translucent so that an inside of the housing 11a can be seen.

The washing machine 10a may include a tub 20a provided inside the housing 11a to store water. The tub 20a may be disposed inside the housing 11a.

The tub 20a may include a tub opening 22a provided to correspond to the housing opening 12a. The tub opening 22a may open substantially upward. The tub 20a may be supported inside the housing 11a. The tub 20a may have a substantially cylindrical shape with one side open.

The tub 20a may be elastically supported from the housing 11a by the damper 80a. The damper 80a may connect the housing 11a and the tub 20a. When the vibration generated by the rotation of the drum 30a is transmitted to the tub 20a and/or the housing 11a, the damper 80a may be provided to attenuate vibration by absorbing vibration energy between the tub 20a and the housing 11a.

The washing machine 10a may include the drum 30a provided to accommodate laundry. The drum 30a may be rotatably provided inside the tub 20a. The drum 30a may rotate within the tub 20a to perform washing, rinsing, and/or dehydration. The drum 30*a* may include a through hole 34*a* connecting the inner space of the drum 30*a* and the inner space of the tub 20*a*. The drum 30*a* may have a substantially cylindrical shape with one side open.

A balancing unit 36*a* may be installed on top of the drum 30*a* to solve load imbalance caused by laundry. The balancing unit 36*a* includes a housing having an annular channel and a ball or a fluid mass body movably provided inside the channel and can solve the load imbalance of the drum 30*a* while the ball or the fluid moves according to the rotation of the drum 30*a*.

A pulsator 37*a* is rotatably provided at the bottom of the drum 30*a* to generate a washing water flow. Laundry may be washed by the wash water flow generated by the pulsator 37*a*.

The drum 30*a* may include a drum opening 32*a* provided to correspond to the housing opening 12*a* and the tub opening 22*a*. Laundry may be put into the drum 30*a* or taken out of the drum 30*a* through the housing opening 12*a*, the tub opening 22*a*, and the drum opening 32*a*.

The washing machine 10*a* may include a washing machine driver 40*a* configured to rotate the drum 30*a* and the pulsator 37*a*. The washing machine driver 40*a* may include a driving motor 41*a* and a shaft system for transmitting the driving force generated by the driving motor 41*a* to the drum 30*a* and the pulsator 37*a*.

The driving motor 41*a* may include a fixed stator 48*a* and a rotor 49*a* that rotates by electromagnetically interacting with the stator 48*a*.

The shaft system may include a dehydration shaft 47*a* arranged to transmit the driving force of the driving motor 41*a* to the drum 30*a*, a washing shaft 46*a* provided to transmit the driving force of the driving motor 41*a* to the pulsator 37*a*, and a clutch device 45*a* that connects or disconnects the driving motor 41*a* and the dehydration shaft 47*a*.

The dehydration shaft 47*a* is formed to have a hollow, and the washing shaft 46*a* may be provided in the hollow of the dehydration shaft 47*a*. The washing shaft 46*a* remains connected to the rotor 49*a* of the driving motor 41*a* and the dehydration shaft 47*a* may be connected to or disconnected from the rotor 49*a* of the driving motor 41*a* by the clutch device 45*a*.

When the clutch device 45*a* disconnects the dehydration shaft 47*a* and the driving motor 41*a*, power is transmitted to the washing shaft 46*a* so that only the pulsator 37*a* rotates, and when the clutch device 45*a* connects the dehydration shaft 47*a* and the driving motor 41*a*, power is transmitted to both the dehydration shaft 47*a* and the washing shaft 46*a* so that the drum 30*a* and the pulsator 37*a* can rotate simultaneously.

When only the pulsator 37*a* rotates, washing water flow is generated by the rotation of the pulsator 37*a*, and laundry is rotated by the washing water flow and rubbed against the drum 30*a*, so that laundry can be washed. When the pulsator 37*a* and the drum 30*a* rotate at the same time, the laundry inside the drum 30*a* is rotated and the laundry is dehydrated by the centrifugal force, so that the laundry can be dehydrated.

The washing machine 10*a* may include a water supply device 50*a*. The water supply device 50*a* may supply water to the tub 20*a*. The water supply device 50*a* may be located above the tub 20*a*. The water supply device 50*a* may include a water supply pipe and a water supply valve provided in the water supply pipe. The water supply pipe may be connected to an external water supply source. The water supply pipe may extend from an external water supply source to a detergent supply device 60*a* and/or the tub 20*a*. Water may be supplied to the tub 20*a* via the detergent supply device 60*a*. Water may be supplied to the tub 20*a* without passing through the detergent supply device 60*a*.

The water supply valve may open or close the water supply pipe in response to an electrical signal from a controller 90. The water supply valve may allow or block the supply of water from an external water supply source to the tub 20*a*. The water supply valve may include, for example, a solenoid valve that opens and closes in response to an electrical signal.

The washing machine 10*a* may include the detergent supply device 60*a* configured to supply detergent to the tub 20*a*. The detergent supply device 60*a* may be configured to supply detergent into the tub 20*a* during the water supply process. Water supplied through the water supply pipe can be mixed with detergent via the detergent supply device 60*a*. Water mixed with detergent may be supplied into the tub 20*a*. The detergent may include not only laundry detergent but also dryer rinse, deodorant, disinfectant or fragrance.

The washing machine 10*a* may include a drain device 70*a*. The drain device 70*a* may be configured to discharge water contained in the tub 20*a* to the outside. A drain port 21*a* may be formed at a lower portion of the tub 20*a* to drain water stored in the tub 20*a* to the outside of the tub 20*a*. A drain hose 74*a* may be connected to the drain port 21*a*, and a drain valve 72*a* for opening and closing the drain hose 74*a* may be provided in the drain hose 74*a*.

The washing machine 10*a* may include at least one user interface device 15*a* for interaction between the user and the washing machine 10*a*. The user interface device 15*a* may include at least one input interface 16*a* and at least one output interface 17*b*.

At least one input interface 16*a* may convert sensory information received from the user into an electrical signal.

At least one input interface 16*a* may include a power button, an operation button, a course selection dial (or a course selection button), and a washing/rinsing/dehydrating setting button. At least one input interface 16*a* may include, for example, a tact switch, a push switch, a slide switch, a toggle switch, a micro switch, a touch switch, a touch pad, a touch screen, a jog dial, and/or microphone, etc.

At least one output interface 17*b* may transmit various data related to the operation of the washing machine 10*a* to the user by generating sensory information.

For example, at least one output interface 17*b* may transmit information related to a washing course, an operating time of the washing machine 10*a*, and washing setting/rinsing setting/spinning setting to the user. Information on the operation of the washing machine 10*a* may be output through a screen, indicator, or voice. At least one output interface 17*b* may include, for example, a Liquid Crystal Display (LCD) panel, a Light Emitting Diode (LED) panel, a speaker, etc.

The clothes treating apparatus 1*a* may include the same filter apparatus 100 as the filter apparatus 100 shown in FIGS. 1 and 2. For example, the filter apparatus 100 according to an embodiment may be connected to a front-loading washing machine or a top-loading washing machine. The filter apparatus 100 may be provided to be connectable to the drain device 70*a* of the washing machine 10*a*. The filter apparatus 100 may be disposed outside the washing machine 10*a*. The filter apparatus 100 may be provided to filter foreign substances from water discharged from the washing machine 10*a*. The filter apparatus 100 may be provided to filter foreign substances having a size smaller than that of foreign substances filterable by the washing machine 10*a*.

For example, the filter apparatus 100 may be provided to filter foreign substances having a size smaller than that of foreign substances filterable by the drain device 70a of the washing machine 10a.

The same control configuration as that of the washing machine 10 shown in FIG. 3 may be applied to the washing machine 10a of the clothes treating apparatus 1a shown in FIGS. 4 and 5.

Figure 6:
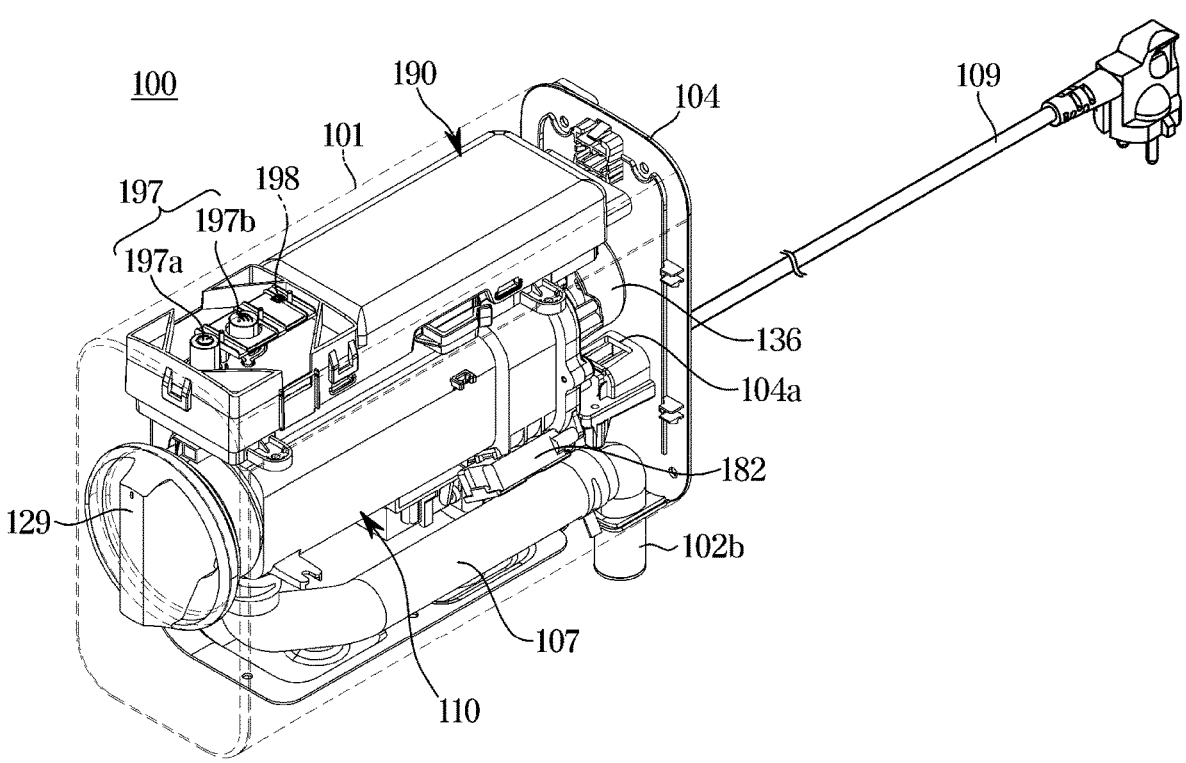
FIG. 6 shows an inside of a filter apparatus shown in FIG. 1 and FIG. 3 according to an embodiment of the disclosure.
Figure 7:
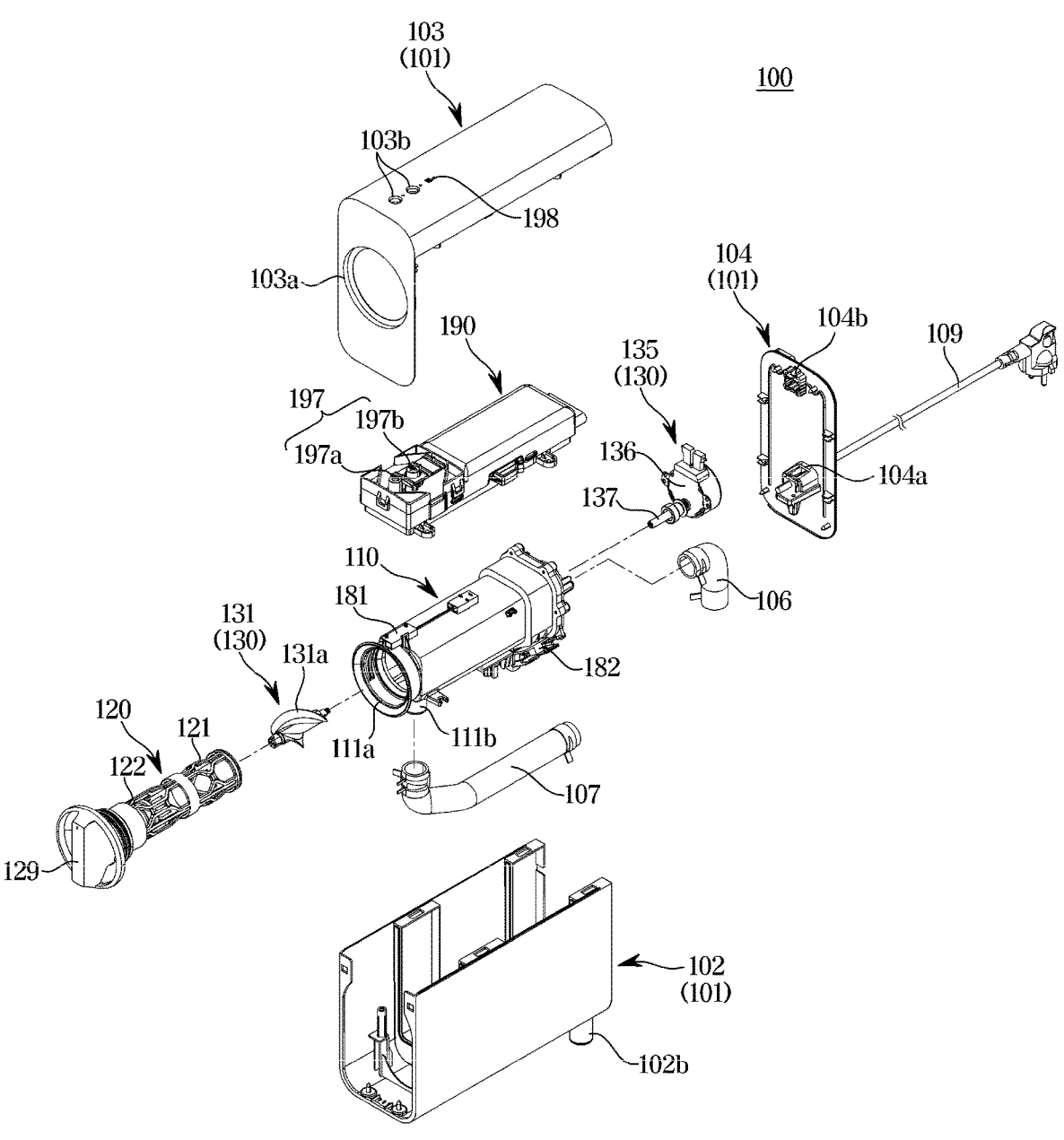
FIG. 7 is an exploded view of the filter apparatus shown in FIG. 6 according to an embodiment of the disclosure.
Figure 8:
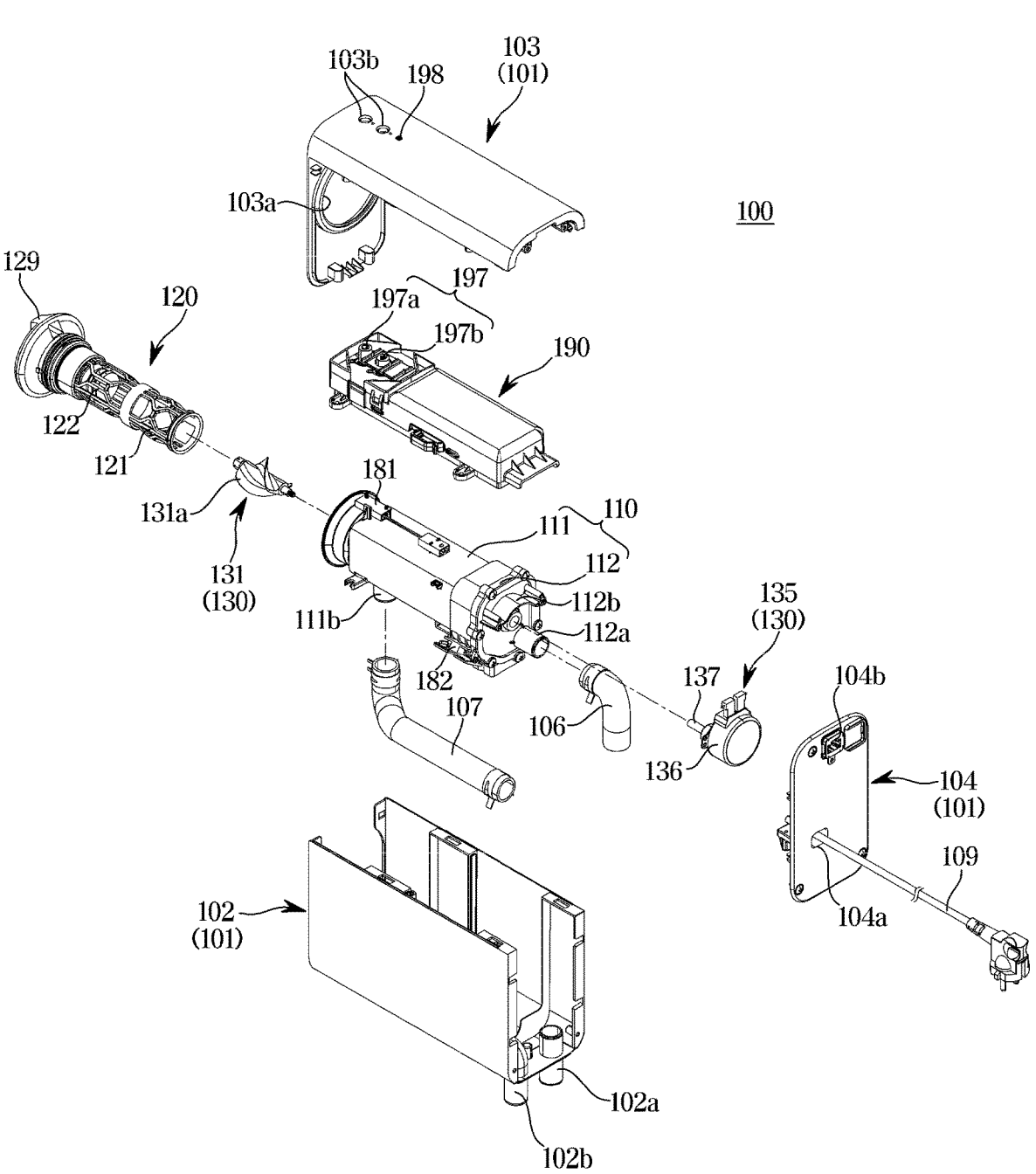
FIG. 8 shows the filter apparatus shown in FIG. 7 in a different direction from FIG. 7 according to an embodiment of the disclosure.
Figure 9:
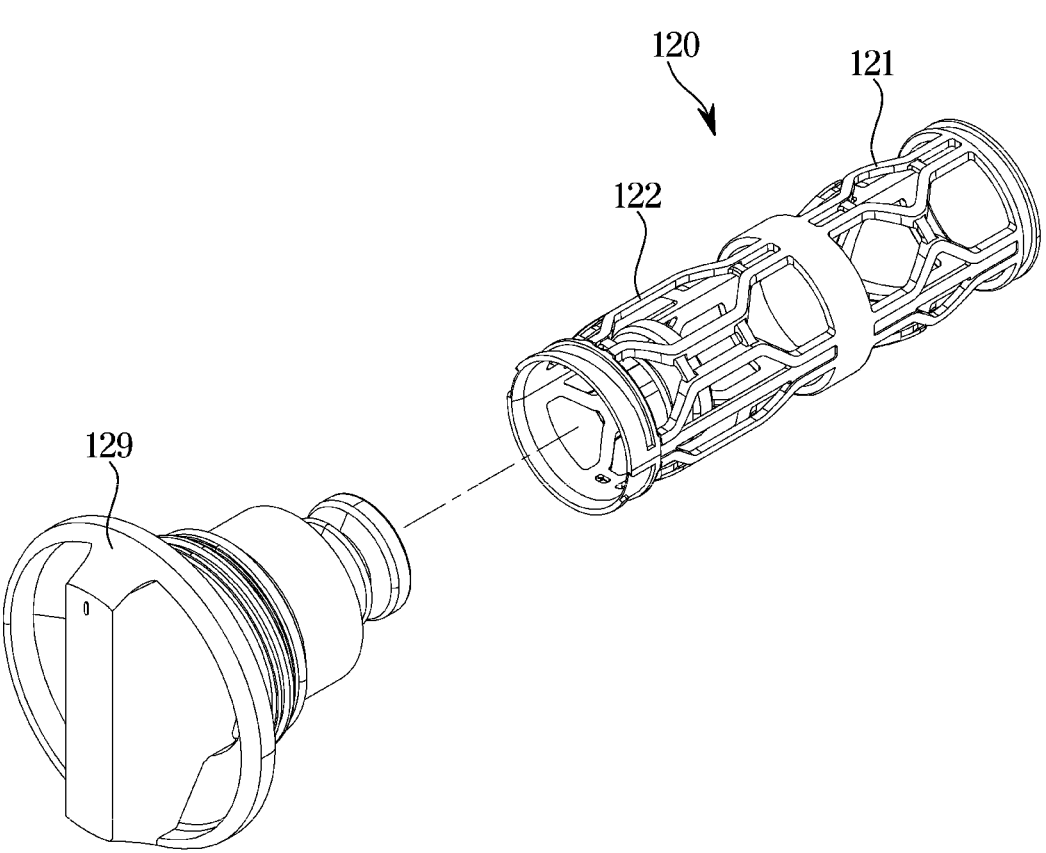
FIG. 9 shows a state in in which a filter and a handle shown in FIG. 8 are separated according to an embodiment of the disclosure.
Figure 10:
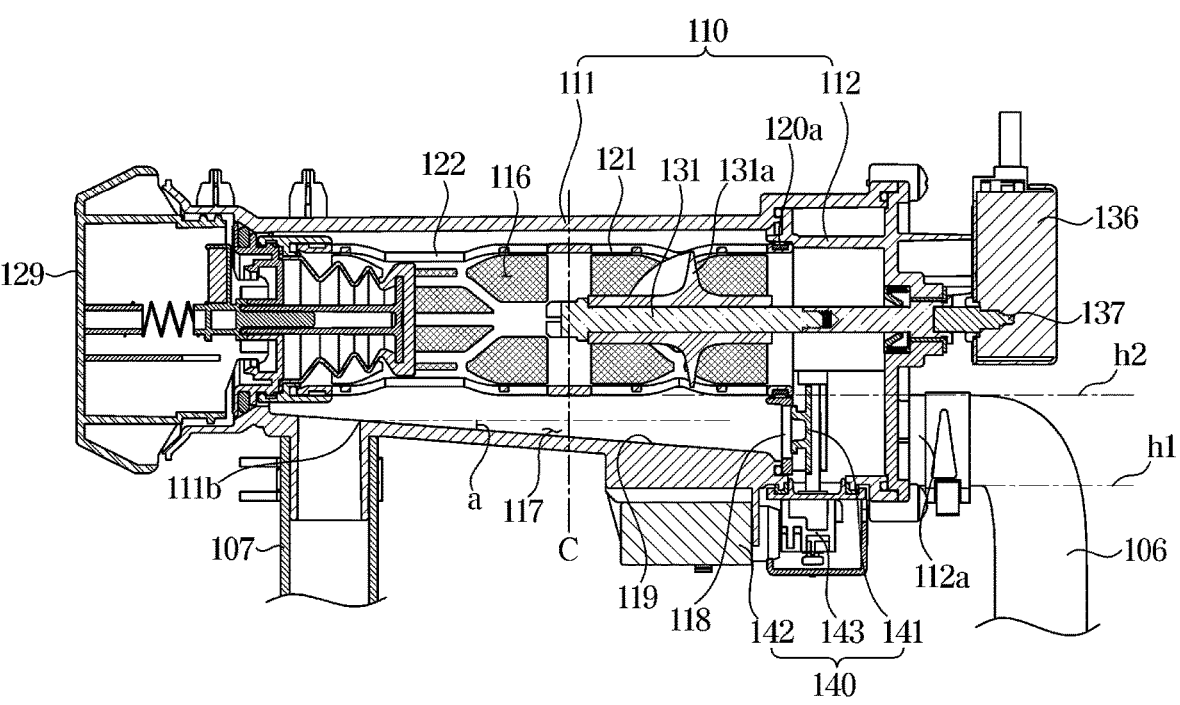
FIG. 10 shows a cross section of some components of the filter apparatus shown in FIG. 6 according to an embodiment of the disclosure.

FIG. 6 shows an inside of a filter apparatus shown in FIG. 1 and FIG. 3. FIG. 7 is an exploded view of the filter apparatus shown in FIG. 6. FIG. 8 shows the filter apparatus shown in FIG. 7 in a different direction from FIG. 7. FIG. 9 shows a state in in which a filter and a handle shown in FIG. 8 are separated. FIG. 10 shows a cross section of some components of the filter apparatus shown in FIG. 6.

Referring to FIGS. 6 to 8, the filter apparatus 100 according to an embodiment may include a filter housing 101 accommodating various components. The filter housing 101 may include a housing body 102, a housing cover 103, and a housing bracket 104. For example, the housing body 102, the housing cover 103, and the housing bracket 104 may be provided as separate components. For example, the housing body 102 may be integrally formed with the housing cover 103. For example, the housing body 102 may be integrally formed with the housing bracket 104. For example, the housing cover 103 may be integrally formed with the housing bracket 104. For example, the housing body 102 may be integrally formed with the housing cover 103 and the housing bracket 104.

The housing body 102 may form a space for accommodating various components. The housing body 102 may have a substantially U shape in cross section perpendicular to a direction in which the filter 120 accommodated therein extends. The housing body 102 may have a box shape with open front, rear and top surfaces. The housing body 102 may be detachably coupled to the housing cover 103 and/or the housing bracket 104.

The housing body 102 may include a housing inlet 102a for receiving water into the interior of the filter apparatus 100, and a housing outlet 102b for discharging water from the interior of the filter apparatus 100 to the exterior of the filter apparatus 100. The housing inlet 102a and/or the housing outlet 102b may be located at a lower portion of the housing body 102.

The housing inlet 102a may be connected with a drain hose 74, 74a of the washing machine 10 and 10a. The housing outlet 102b may be connected with a drain line 105.

The housing cover 103 may be provided to cover the open front and upper surfaces of the housing body 102. The housing cover 103 may be detachably coupled to the housing body 102 and/or the housing bracket 104. The housing cover 103 may include a cover opening 103a formed to allow the filter 120 to pass therethrough. The housing cover 103 may include an installation portion 103b where a user interface device 197 is installed. At least a portion of the user interface device 197 may be exposed to the outside of the filter apparatus 100 through the installation portion 103b.

The housing bracket 104 may be provided to cover the open rear surface of the housing body 102. The housing bracket 104 may be detachably coupled to the housing body 102 and/or the housing cover 103. The housing bracket 104 may include a cable opening 104a formed to allow the power cable 109 to pass therethrough. The housing bracket 104 may include a connector mounting portion 104b formed to connect a connector for communication with an external device including the washing machine 10 and the like.

The filter apparatus 100 may include a filter case 110 located inside the filter housing 101. The filter case 110 may form a flow path through which water flowing into the filter apparatus 100 passes. The filter case 110 may be provided to accommodate the filter 120. The filter case 110 may include a case body 111 and a case cover 112.

The case body 111 may extend along the direction in which the filter 120 accommodated therein extends. The case body 111 may include a case opening 111a formed to allow the filter 120 to pass therethrough. The case opening 111a may be provided to correspond to the cover opening 103a. The case opening 111a is located closer to the case outlet 111b than the case inlet 112a, and may be provided so that the filter 120 can pass therethrough.

The case body 111 may include a case outlet 111b for discharging water flowing into the filter case 110 from the filter case 110. The case outlet 111b may be located at a lower portion of the case body 111. The case outlet 111b may be located adjacent to the case opening 111a. The case outlet 111b may be located close to the other end opposite to one end where the filter opening 120a of the filter 120 is located. The case outlet 111b may be located closer to a second filter portion 122 than to a first filter portion 121 of the filter 120.

The case outlet 111b may be connected to the housing outlet 102b. The filter apparatus 100 may include a discharge guide 107 for connecting the case outlet 111b and the housing outlet 102b.

The case cover 112 may be detachably coupled to the other end opposite to one end of the case body 111 where the case opening 111a is located. For example, the case cover 112 may be integrally formed with the case body 111.

The case cover 112 may include a case inlet 112a through which water flows into the filter case 110. The case inlet 112a may be connected to the housing inlet 102a. The filter apparatus 100 may include an inflow guide 106 for connecting the case inlet 112a and the housing inlet 102a.

The case cover 112 may include a motor mounting portion 112b for mounting a filter cleaning device 130 thereon. The motor mounting portion 112b may be positioned above the case inlet 112a. A cleaning motor 136 of the filter cleaning device 130 may be mounted on the motor mounting portion 112b.

The filter apparatus 100 may include the filter 120 detachably coupled to the filter case 110. The filter 120 may be provided to filter fine-sized foreign substances. The filter 120 may be provided to filter microplastics having a size of about 5 mm or less. The filter 120 may include a mesh filter. The filter 120 may extend approximately between the case inlet 112a and the case outlet 111b.

When the filter 120 is mounted on the filter case 110, the filter 120 may include a filter opening 120a opened toward the case inlet 112a. Water flowing into the filter case 110 through the case inlet 112a may move into the filter 120 through the filter opening 120a.

The filter 120 may include the first filter portion 121 and the second filter portion 122. The first filter portion 121 may be located closer to the case inlet 112a than the second filter portion 122. In the water flowing into the filter case 110, foreign substances may be filtered through the first filter portion 121 or may not be filtered in the first filter portion 121, and after passing through the first filter portion 121, foreign substances may be filtered in the second filter portion 122. The first filter portion 121 and the second filter portion 122 may be sequentially disposed along a direction in which the filter 120 extends. Foreign substances transferred from the first filter portion 121 may be collected in the second filter portion 122 by the filter cleaning device 130.

The filter apparatus 100 may include a handle 129 at least partially exposed to the outside of the filter housing 101 when the filter 120 is mounted on the filter case 110. Referring to FIG. 9, the handle 129 may be detachably coupled to the filter 120. As the handle 129 is detachably coupled to the filter 120, the filter 120 can be easily maintained and/or repaired. The handle 129 may rotate and be coupled to the cover opening 103*a* and/or the case opening 111*a*.

The filter apparatus 100 may include the filter cleaning device 130 for cleaning the filter 120. The filter cleaning device 130 may be mounted on the filter case 110. The filter cleaning device 130 may include a cleaning member 131 for cleaning the surface of the filter 120 through which foreign substances are filtered, and a cleaning driving device 135 for driving the cleaning member 131.

The cleaning member 131 may be located inside the filter 120. The cleaning member 131 may be provided to correspond to the first filter portion 121 of the filter 120. The cleaning member 131 may have a spirally extending blade 131*a*. The blade 131*a* may extend in a radial direction from the rotation axis of the cleaning member 131. The cleaning member 131 may be provided to contact the surface of the filter 120 through which foreign substances are filtered. The cleaning member 131 may be provided to contact the inner surface of the filter 120. For example, the cleaning member 131 may include a plurality of brushes.

While the cleaning member 131 is driven by the cleaning driving device 135, the cleaning member 131 may be arranged to transfer foreign substances being filtered from a portion of the filter 120 closer to the case inlet 112*a* to a portion of the filter 120 closer to the case outlet 111*b* of the filter 120. The cleaning member 131 may be provided to transfer foreign substances filtered through the first filter portion 121 to the second filter portion 122. For example, the cleaning member 131 may be rotatably provided inside the filter 120. The cleaning member 131 may include a flexible material. The cleaning member 131 rotates in contact with the filter 120 and can clean foreign substances filtered by the filter 120. While the cleaning member 131 is driven in contact with the filter 120, the cleaning member 131 can scrape and remove foreign substances attached to the surface of the filter 120 through which foreign substances are filtered. For example, the cleaning member 131 may be slidably provided inside the filter 120.

As the cleaning member 131 is provided to transfer foreign substances filtered by the first filter portion 121 to the second filter portion 122 and the water flowing into the filter case 110 flows from the first filter portion 121 to the second filter portion 122, foreign substances filtered through the first filter portion 121 may be efficiently collected in the second filter portion 122. Considering the flow of water passing through the filter 120, the cleaning member 131 may be disposed behind a reference line C shown in FIG. 10 and the case outlet 111*b* may be disposed in front of the reference line C shown in FIG. 10.

The cleaning driving device 135 may include the cleaning motor 136 and a motor shaft 137. The cleaning motor 136 may be configured to generate power for driving the cleaning member 131. The motor shaft 137 may be connected to the cleaning member 131. The cleaning motor 136 may be mounted on the filter case 110. The cleaning motor 136 may be located closer to the case inlet 112*a* than to the case outlet 111*b*.

The filter apparatus 100 may include a circuitry 190 located inside the filter housing 101. The circuitry 190 may be located at the upper end of the inside of the filter housing

16

101. The circuitry 190 may be located on one side of the filter case 110. For example, the circuitry 190 may be located above the filter case 110. For example, the circuitry 190 may be disposed above the filter 120.

The circuitry 190 may include a controller 191 for controlling the filter apparatus 100 and a communication part 199 for communicating with the washing machines 10 and 10*a*.

The filter apparatus 100 may include the user interface device 197 positioned above the circuitry 190. At least a portion of the user interface device 197 may be exposed to the outside of the filter apparatus 100 through the installation portion 103*b* of the filter housing 101. The user interface device 197 may be located on the upper surface of the filter apparatus 100. The user interface device 197 may include a first button 197*a* and a second button 197*b*. The first button 197*a* may include one of a power button and a WiFi connection button. The second button 197*b* may include a power button and a Wi-Fi connection button different from the first button 197*a*.

The filter apparatus 100 may include a display 198 displaying visualized information related to the filter apparatus 100. The display 198 may be located on the upper surface of the filter apparatus 100. For example, the display 198 may be provided as one component of the user interface device 197.

The filter apparatus 100 may include a filter sensor 181 that acquires information about the state of the filter 120. The filter sensor 181 may be mounted on the filter case 110. The filter sensor 181 may be located outside the filter case 110. The filter sensor 181 may be positioned to correspond to the second filter portion 122 of the filter 120 mounted on the filter case 110. For example, the filter sensor 181 may include a magnetic sensor. For example, the filter sensor 181 may include an optical sensor.

The filter apparatus 100 may include a water supply sensor 182 for detecting that water is supplied to the filter apparatus 100. The water supply sensor 182 may be mounted on the lower part of the filter case 110. The water supply sensor 182 may be located close to the case inlet 112*a* of the filter case 110.

Referring to FIG. 10, the filter case 110 may include a remaining water guide 119 formed to guide remaining water inside the filter case 110. The remaining water guide 119 may be located under the filter 120 in the direction of gravity. For example, the remaining water guide 119 may be formed with a downward slope from the case outlet 111*b* toward the case inlet 112*a*. The remaining water guide 119 may be inclined to have a predetermined angle (a) with respect to a direction perpendicular to the direction of gravity. It is possible to prevent water inside the filter case 110 from being discharged to the outside of the filter apparatus 100 through the case outlet 111*b* by the remaining water guide 119.

The position of the lower end of the inlet of the case outlet 111*b* along the direction of gravity may be higher than the position of the lower end of the case inlet 112*a* along the direction of gravity. When residual water is generated inside the filter case 110, the residual water may move toward the case inlet 112*a* from the periphery of the case outlet 111*b* due to gravity. For example, the bottom surface of the filter case 110 between an inlet of the case outlet 111*b* and the case inlet 112*a* may be provided to include a stepped portion.

The case inlet 112*a* may be positioned below the filter 120. The top of the case inlet 112*a* in the direction of gravity may be located below the top of the filter 120 in the direction of gravity. The lowest end of the case inlet 112*a* according to the direction of gravity may be located below the lowest end of the filter 120 according to the direction of gravity. The lowermost height h1 of the case inlet 112a in the direction of gravity may be lower than the height h2 of the filter 120 in the direction of gravity. The inlet of the case outlet 111b may be located below the filter 120.

The filter case 110 may include a connecting hole 118. The connecting hole 118 may be located at one end of the remaining water guide 119 close to the case inlet 112a. The connecting hole 118 may be formed in the filter case 110 so that water guided by the remaining water guide 119 can be discharged toward the case inlet 112a.

The filter apparatus 100 may include an opening and closing device 140 for opening and closing the connecting hole 118. The opening and closing device 140 may include a connecting door 141 and a door motor 142 for operating the connecting door 141.

The connecting door 141 may be provided to open and close the connecting hole 118. The connecting door 141 may be provided in a size and/or shape capable of closing the connecting hole 118. The connecting door 141 may be rotatably coupled to the filter case 110. The connecting door 141 may be rotatably provided in a direction in which water flows from the remaining water guide 119 to the case inlet 112a. The connecting door 141 may be provided to be rotatable in a direction opposite to a direction in which water introduced through the case inlet 112a flows into the connecting hole 118. The connecting door 141 may be provided to prevent opening of the connecting hole 118 by hydraulic pressure of water introduced through the case inlet 112a.

The door motor 142 may be provided to generate power for operating the connecting door 141. The opening and closing device 140 may include a power transmission device 143 for transmitting power generated by the door motor 142 to the connecting door 141. Power generated by the door motor 142 may be transmitted to the connecting door 141 through the power transmission device 143.

A filtering flow path 116 passing through the filter 120 and a bypass flow path 117 bypassing the filter 120 may be formed inside the filter case 110. Water introduced through the case inlet 112a may move to the case outlet 111b through the filtering flow path 116 or may move to the case outlet 111b through the bypass flow path 117.

The connecting hole 118 may be located at one end of the bypass flow path 117 close to the case inlet 112a. While the connecting door 141 opens the connecting hole 118, water introduced through the case inlet 112a may directly move to the bypass flow path 117 without passing through the filtering flow path 116. While the connecting door 141 opens the connecting hole 118, water in the bypass flow path 117 may directly move to the case inlet 112a without passing through the filtering flow path 116. The connecting hole 118 may be formed so that water in the bypass flow path 117 can move to the case inlet 112a or water flowing into the case inlet 112a can move to the bypass flow path 117.

Figure 11:
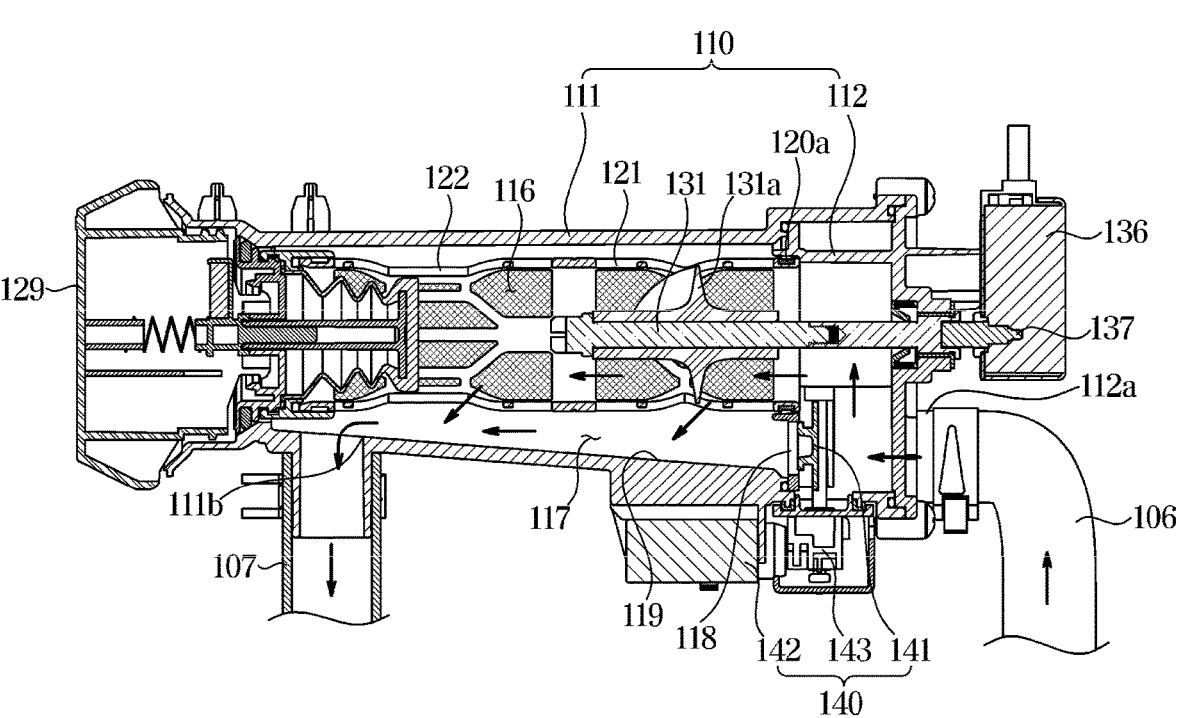
FIG. 11 shows a flow of water flowing into a filter case shown in FIG. 10 according to an embodiment of the disclosure, and then being discharged after passing through the filter.
Figure 12:
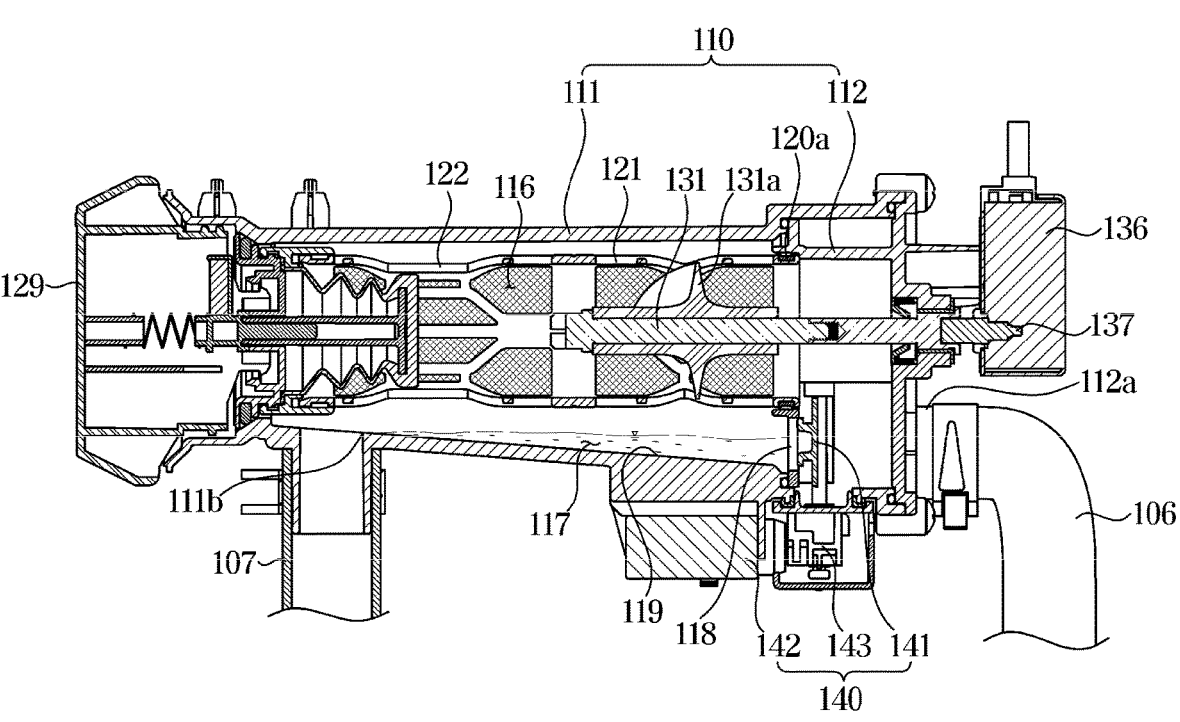
FIG. 12 shows a state in which water remains in the filter case shown in FIG. 10 according to an embodiment of the disclosure.
Figure 13:
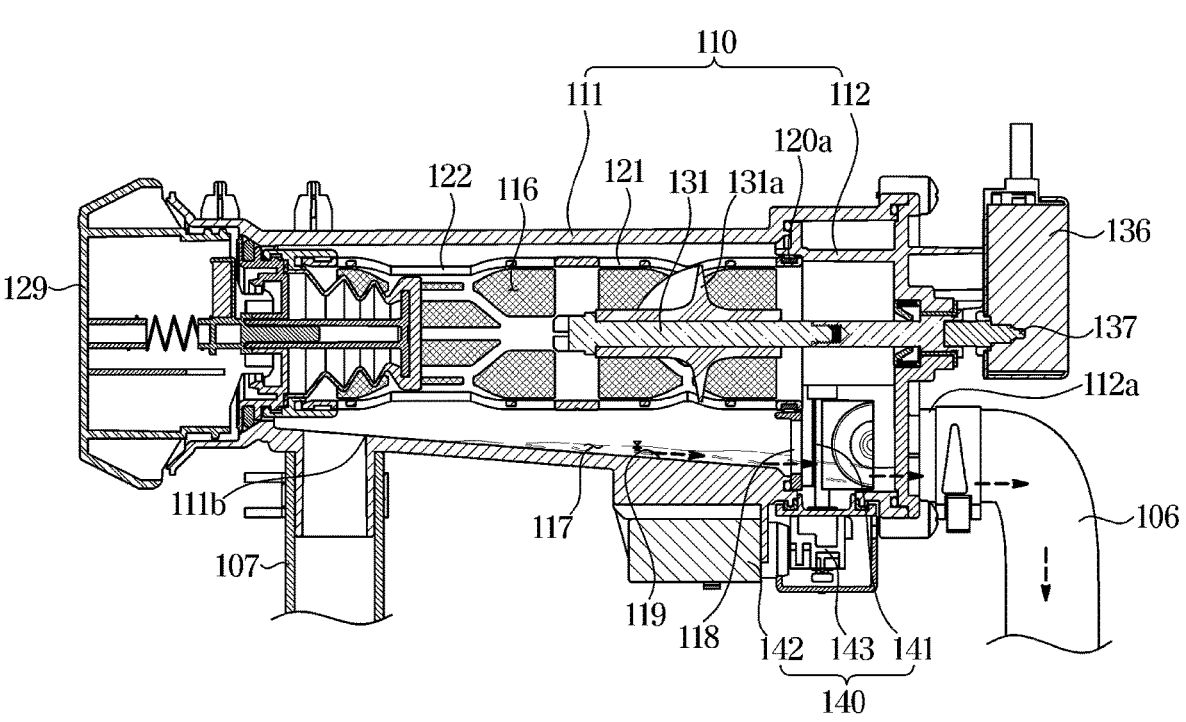
FIG. 13 shows a flow of remaining water discharged from the filter case shown in FIG. 12 according to an embodiment of the disclosure.

FIG. 11 shows a flow of water flowing into a filter case shown in FIG. 10 and then being discharged after passing through the filter. FIG. 12 shows a state in which water remains in the filter case shown in FIG. 10. FIG. 13 shows a flow of remaining water discharged from the filter case shown in FIG. 12.

Referring to FIG. 11, water flowing into the filter apparatus 100 through the housing inlet 102a may be guided to the filter case 110 by the inflow guide 106. Water flowing into the filter case 110 through the case inlet 112a may flow into the filter 120 through the filter opening 120a. Water introduced into the filter case 110 may flow into the filtering flow path 116. Since the connecting door 141 closes the connecting hole 118, water flowing into the filter case 110 cannot flow to the bypass flow path 117 through the connecting hole 118. Water flowing into the filter 120 passes through the filter 120 and foreign substances can be filtered out. Water passing through the filter 120 may be discharged to the outside of the filter case 110 through the case outlet 111b. Water discharged through the case outlet 111b may be discharged from the filter apparatus 100 by sequentially passing through the discharge guide 107 and the housing outlet 102b. Water discharged from the filter apparatus 100 may be guided through a drain line 105.

Referring to FIG. 12, when the inflow of water into the filter apparatus 100 is stopped, residual water may be generated inside the filter case 110. Residual water may be stored at the bottom of the filter case 110 by gravity. The residual water may be stored in the bypass flow path 117.

Referring to FIG. 13, as the connecting door 141 opens the connecting hole 118, residual water stored in the bottom of the filter case 110 may flow into the case inlet 112a. Residual water flowing into the case inlet 112a may be discharged to the outside of the filter apparatus 100 by sequentially passing through the inflow guide 106 and the housing inlet 102a. Residual water discharged to the outside of the filter apparatus 100 may be guided to the drain devices 70 and 70a of the washing machines 10 and 10a by the drain hoses 74 and 74a.

Figure 14:
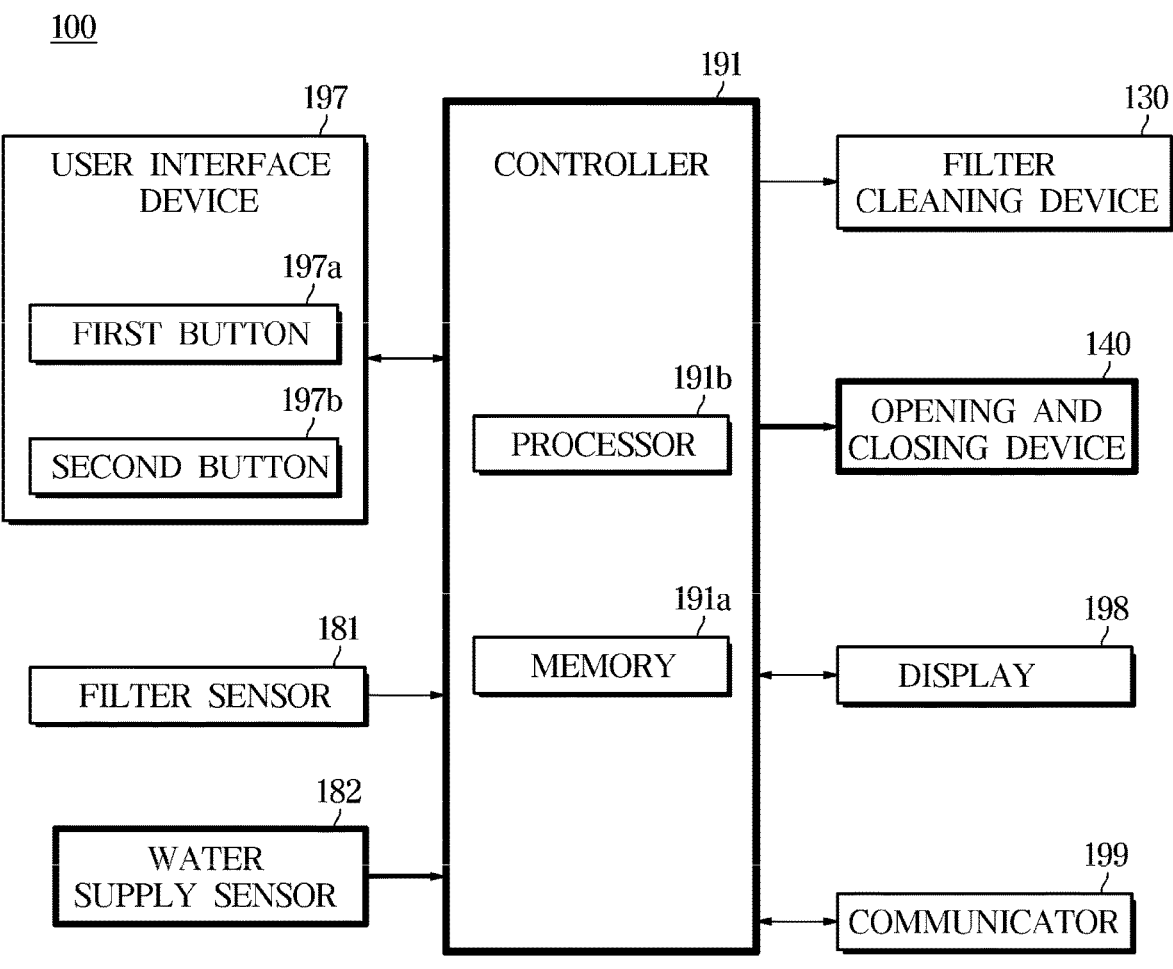
FIG. 14 shows configurations of a filter apparatus and signal flow between the configurations, according to an embodiment of the disclosure.

FIG. 14 shows configurations of a filter apparatus and signal flow between the configurations, according to an embodiment.

Referring to FIG. 14, a control method for discharging residual water inside the filter case 110 of the filter apparatus 100 to the outside of the filter apparatus 100 shown in FIGS. 6 to 13 will be described.

Referring to FIG. 14, the filter apparatus 100 according to an embodiment includes a user interface device 197 for interacting with a user, a filter sensor 181, a water supply sensor 182, a cleaning motor 136, a door motor 142, a display 198, a communication part 199, and a controller 191 for controlling various configurations of the filter apparatus 100.

The controller 191 may include at least one memory 191a and at least one processor 191b to perform the above-described operation and the operation to be described later.

In an embodiment, the controller 191 may include at least one memory 191a that stores data in the form of an algorithm and/or program for controlling the operation of components in the filter apparatus 100 and at least one processor 191b that performs the above-described operation and the below-described operation using data stored in the at least one memory 191a. The memory 191a and the processor 191b may be implemented as separate chips. The processor 191b may include one or more processor chips or may include one or more processing cores. The memory 191a may include one or more memory chips or one or more memory blocks. Also, the memory 191a and the processor 191b may be implemented as a single chip.

The controller 191 may process a user input received through the user interface device 197 and control various components of the filter apparatus 100 (e.g., filter cleaning device 130, opening and closing device 140, display 198) based on the processed user input.

The user interface device 197 may include a first button 197a and a second button 197b, and may be operable based on a control signal from the controller 191.

The filter sensor 181 may be mounted on the filter case 110. The filter sensor 181 may detect the amount of foreign substances collected in the filter 120.

For example, the filter sensor 181 may include an optical sensor (e.g., an infrared sensor) that detects the amount of foreign substances collected in the filter 120. However, the type of filter sensor 181 is not limited thereto, and any configuration capable of detecting the amount of foreign substances collected in the filter 120 may be adopted as the filter sensor 181.

The water supply sensor 182 may be mounted on the filter case 110. The water supply sensor 182 may detect the inflow of water into the filter case 110.

For example, the water supply sensor 182 may include a capacitive sensor that detects the inflow of water into the filter case 110. However, the type of water supply sensor 182 is not limited thereto, and any configuration capable of detecting the inflow of water into the filter case 110 may be adopted as the water supply sensor 182.

The controller 191 may process sensor data received through the filter sensor 181 and/or the water supply sensor 182 and control various components of the filter apparatus 100 (e.g., filter cleaning device 130, opening and closing device 140) based on the processed sensor data.

The filter cleaning device 130 may include a cleaning member 131 slidably and rotatably inserted into the inner surface of the filter 120 and a cleaning motor 136 for rotating the cleaning member 131.

The controller 191 may control the filter cleaning device 130.

In an embodiment, the controller 191 may control a driving circuit that applies driving current to the cleaning motor 136. The driving circuit may supply driving current to the cleaning motor 136 in response to a driving signal from the controller 191. The driving circuit may include a rectifying circuit for rectifying AC power of an external power source, a DC link circuit that removes ripple of the rectified power and outputs DC power, an inverter circuit that converts DC power into sine wave type driving power and outputs the driving current to the cleaning motor 136, a current sensor that measures a driving current supplied to the cleaning motor 136, and a gate driver that turns on/off the switching element included in the inverter circuit based on a driving signal from the controller 191.

The driving circuit connected to the cleaning motor 136 may include components for driving the DC motor.

The opening and closing device 140 may include the connecting door 141 for opening and closing the connecting hole 118 and the door motor 142 for operating the connecting door 141.

The controller 191 may control the opening and closing device 140 to guide water flowing into the filter case 110 to the filtering flow path 116 based on a first preset condition being satisfied.

In addition, the controller 191 may control the opening and closing device 140 to guide water flowing into the filter case 110 to the bypass flow path 117 based on a second preset condition being satisfied.

The display 198 may display visualized information related to the filter apparatus 100. For example, the display 198 may be provided in a separate configuration from the user interface device 197. For example, the display 198 may be provided as one component of the user interface device 197.

The communication part 199 may transmit data to an external device or receive data from the external device based on a control signal of the controller 191. For example, the communication part 199 may transmit/receive various types of data by communicating with a server and/or a user terminal device and/or home appliances including the washing machines 10 and 10a.

For this, the communication part 199 may establish a direct (wired) communication channel or a wireless communication channel with an external electronic device (for example, a server, a user terminal, and/or a home appliance), and support communication through the established communication channel. According to an embodiment of the disclosure, the communication part 199 may include a wireless communicator (for example, a cellular communicator, a short-range wireless communicator, or a global navigation satellite system (GNSS) communicator), or a wired communicator (for example, a local area network (LAN) communicator or a power line communicator). A corresponding communicator among the communicators may communicate with an external electronic device through a first network (for example, a short-range communication network, such as Bluetooth, wireless fidelity (WiFi) direct, or infrared data association (IrDA)) or a second network (for example, a telecommunication network, such as a legacy cellular network, a 5G network, a next-generation communication network, internet, or a computer network (for example, a local area network (LAN) or a wide area network (WAN)). Such various kinds of communicators may be integrated into a component (for example, a single chip) or implemented as a plurality of independent components (for example, a plurality of chips).

According to various embodiments, the communication part 199 may establish communication with a user terminal device through a server.

According to various embodiments of the disclosure, the communication part 199 may include a WiFi module, and may perform communication with an external server and/or a user terminal based on communication establishment with an Access Point (AP) in home.

For example, the controller 191 may operate the opening and closing device 140 based on processing sensor data received through the water supply sensor 182.

In an embodiment, the controller 191 may operate the opening and closing device 140 based on sensing that the water supply to the filter apparatus 100 is stopped through the water supply sensor 182. As the water supply sensor 182 detects that the water supply to the filter apparatus 100 has stopped, the controller 191 may control the opening and closing device 140 so that the opening and closing device 140 opens the connecting hole 118.

In an embodiment, the controller 191 may control the opening and closing device 140 based on sensing that water supply to the filter apparatus 100 is progressed through the water supply sensor 182. As the water supply sensor 182 detects that the water supply to the filter apparatus 100 is progressing, the controller 191 may control the opening and closing device 140 so that the opening and closing device 140 closes the connecting hole 118.

According to the present disclosure, while the filter 120 is separated to manage (maintenance and/or repair) the filter apparatus 100, the clothes treating apparatus 1 can prevent residual water of the filter case 110 from being discharged to the outside of the filter apparatus 100 through the cover opening 103a and the case opening 111a, therefore, it is possible to prevent the outside of the clothes treating apparatus 1 from being contaminated.

Figure 15:
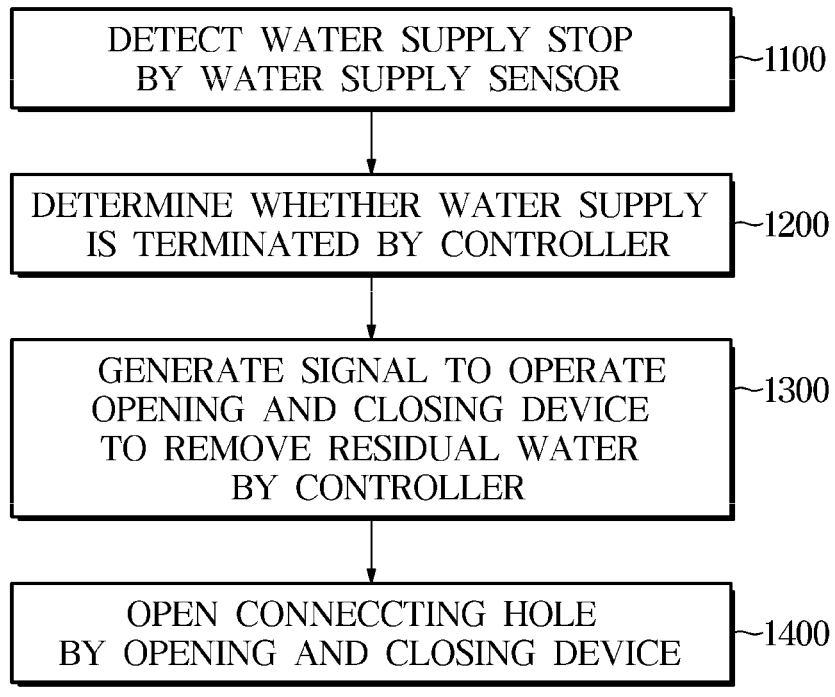
FIG. 15 shows a flowchart of a control method of a filter apparatus according to an embodiment of the disclosure.

FIG. 15 shows a flowchart of a control method of a filter apparatus according to an embodiment.

Referring to FIG. 15, the water supply sensor 182 may detect that water supply to the filter apparatus 100 is stopped (operation 1100). The water supply sensor 182 may obtain information about the drainage state of the washing machines 10 and 10*a*. The controller 191 may receive information about the supply of water to the filter apparatus 100 from the water supply sensor 182 that acquires information about the supply of water to the filter apparatus 100 and may detect whether or not water is supplied to the filter apparatus 100.

The controller 191 may determine the end of the water supply to the filter apparatus 100 based on the detection of the interruption of the water supply to the filter apparatus 100 (operation 1200). The controller 191 may determine that the water drainage of the washing machines 10 and 10*a* has ended based on the detection of the interruption of the water supply to the filter apparatus 100.

The controller 191 may generate a signal for operating the opening and closing device 140 to remove residual water inside the filter case 110 based on the detection of the end of the water supply to the filter apparatus 100 (operation 1300). The controller 191 may control the opening and closing device 140 to remove residual water inside the filter case 110 based on the detection of the end of draining of the washing machines 10 and 10*a*.

When the water supply to the filter apparatus 100 is finished, the opening and closing device 140 may open the connecting hole 118 of the filter case 110 (operation 1400). When the draining of the washing machine 10, 10*a* is finished, the opening and closing device 140 may open the connecting hole 118 of the filter case 110.

Figure 16:
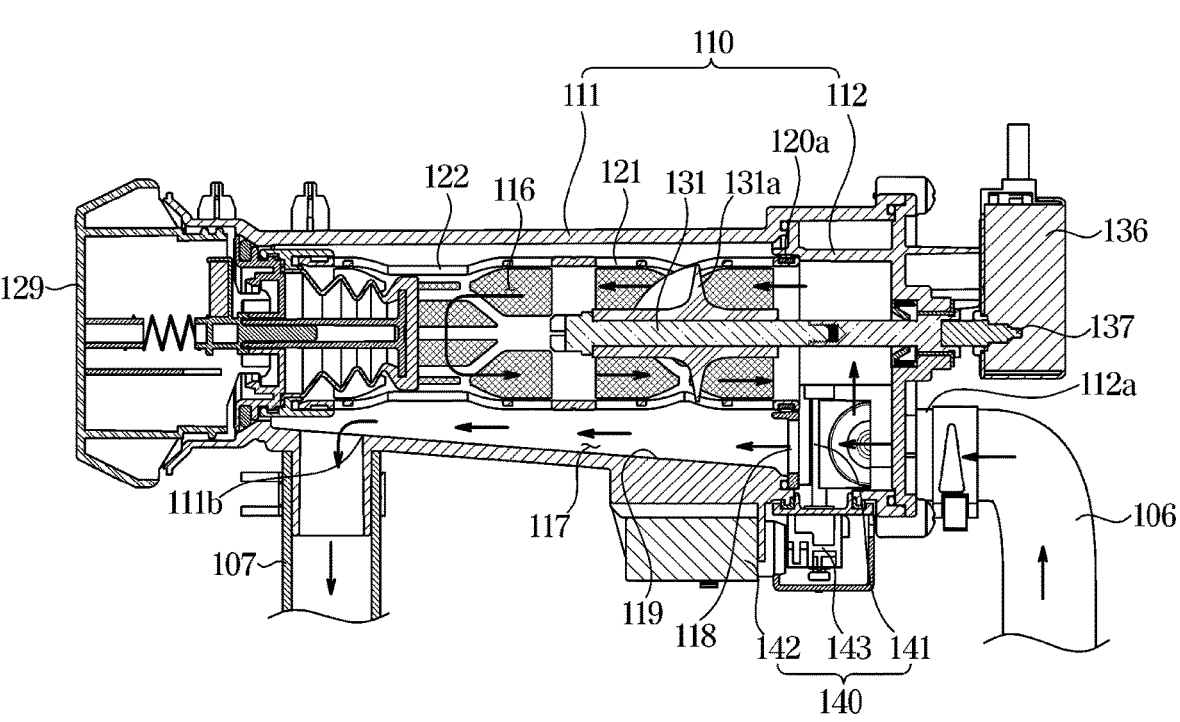
FIG. 16 shows a flow of water when the filter shown in FIG. 10 is clogged according to an embodiment of the disclosure.

FIG. 16 shows a flow of water when the filter shown in FIG. 10 is clogged.

Referring to FIG. 16, when the filter 120 of the filter apparatus 100 is clogged by foreign substances, the opening and closing device 140 may open the connecting hole 118. When the filter 120 is clogged by foreign substances, the opening and closing device 140 may open the bypass flow path 117. The connecting door 141 may rotate to open the connecting hole 118. The connecting door 141 may rotate to open the bypass flow path 117.

As the bypass flow path 117 is opened, water flowing into the filter case 110 may move along the bypass flow path 117. Water introduced into the filter case 110 may be introduced into the bypass flow path 117 through the connecting hole 118 and then discharged to the outside of the filter case 110 through the case outlet 111*b*.

According to this configuration, the clothes treating apparatus 1 according to various embodiments can discharge water from the filter apparatus 100 even if a part of the filter 120 is clogged, therefore, it is possible to prevent the operation of the filter apparatus 100 from being stopped.

Figure 17:
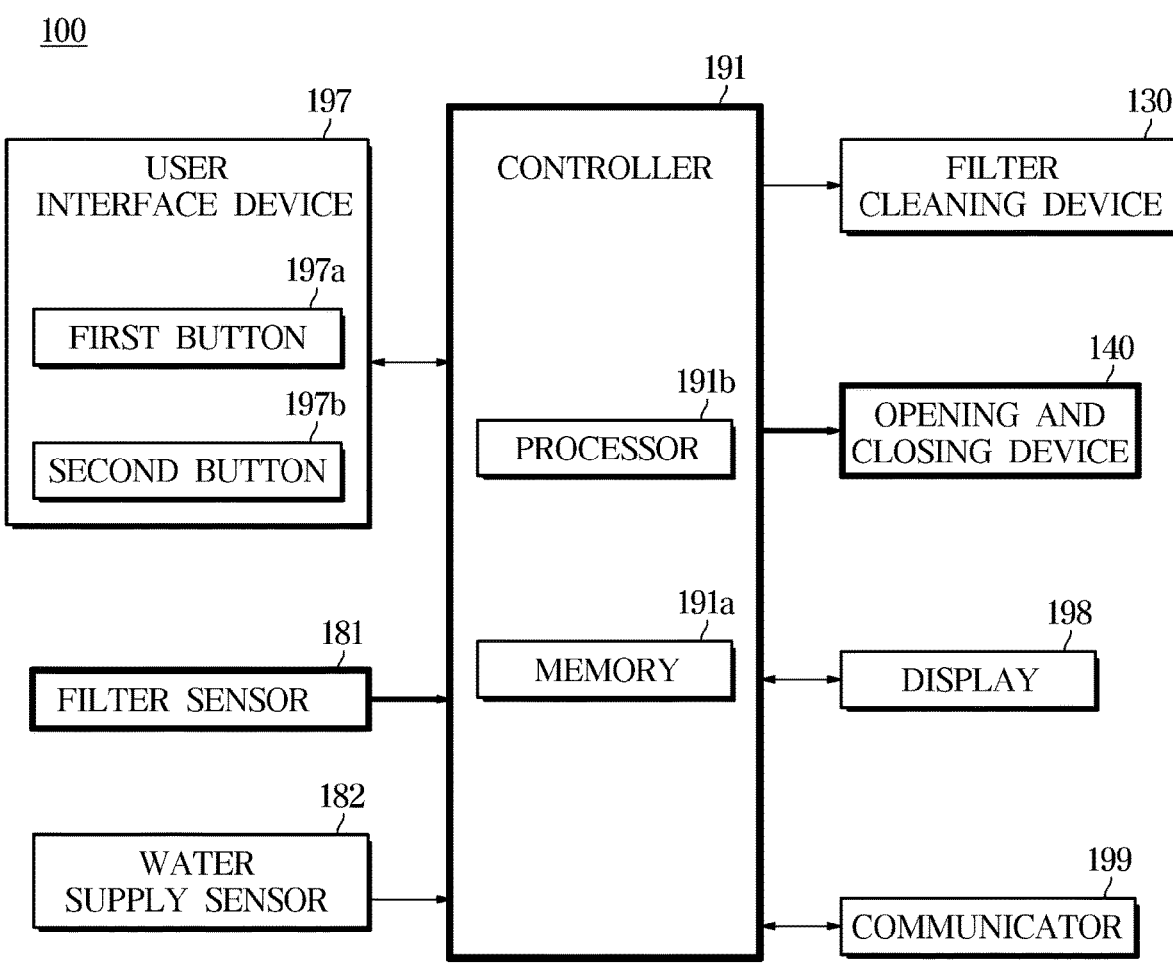
FIG. 17 shows configurations of a filter apparatus and signal flow between the configurations, according to an embodiment of the disclosure.

FIG. 17 shows configurations of a filter apparatus and signal flow between the configurations, according to an embodiment.

Referring to FIG. 17, a control method of the opening and closing device 140 of the filter apparatus 100 shown in FIGS. 6 to 13 will be described. Descriptions of components overlapping those shown in FIG. 14 may be omitted.

Referring to FIG. 17, the controller 191 may operate the filter sensor 181 when the filter apparatus 100 is driven.

As described above, the controller 191 may control the opening and closing device 140 to guide water flowing into the filter case 110 to the filtering flow path 116 based on the first preset condition being satisfied and may control the opening and closing device 140 to guide water flowing into the filter case 110 to the bypass flow path 117 based on the second preset condition being satisfied.

In this case, the first preset condition and the second preset condition may be information about the state of the filter 120. For example, the first preset condition may be a condition in which clogging of the filter 120 is not detected, and the second preset condition may be a condition in which clogging of the filter 120 is detected.

The filter sensor 181 may detect whether the filter 120 is clogged. For example, the filter sensor 181 may irradiate light to the second filter portion 122 and detect the amount of foreign substances collected in the second filter portion 122 upon receiving the reflected light. Information on the amount of foreign substances obtained from the filter sensor 181 may be digitized.

The controller 191 may determine whether the filter 120 is clogged based on information obtained from the filter sensor 181.

For example, the controller 191 may determine that the filter 120 is clogged based on the fact that the amount of foreign substances collected in the filter 120 is greater than a preset amount and may determine that the filter 120 is not clogged based on the fact that the amount of foreign substances collected in the filter 120 is less than a preset amount.

The controller 191 may control the opening and closing device 140 to guide water flowing into the filter case 110 to the bypass flow path 117 based on the determination that the filter 120 is clogged. The opening and closing device 140 may control the connecting door 141 to open the bypass flow path 117 based on a control signal from the controller 191.

The controller 191 may control the opening and closing device 140 to guide water flowing into the filter case 110 to the filtering flow path 116 based on the determination that the filter 120 is not clogged. The opening and closing device 140 may control the connecting door 141 to close the bypass flow path 117 based on a control signal from the controller 191.

In this embodiment, the controller 191 may control the connecting door 141 to open the bypass flow path 117 based on the detection of clogging of the filter 120 through the filter sensor 181 and may control the connecting door 141 to close the bypass flow path 117 based on the fact that clogging of the filter 120 is not detected through the filter sensor 181.

Figure 18:
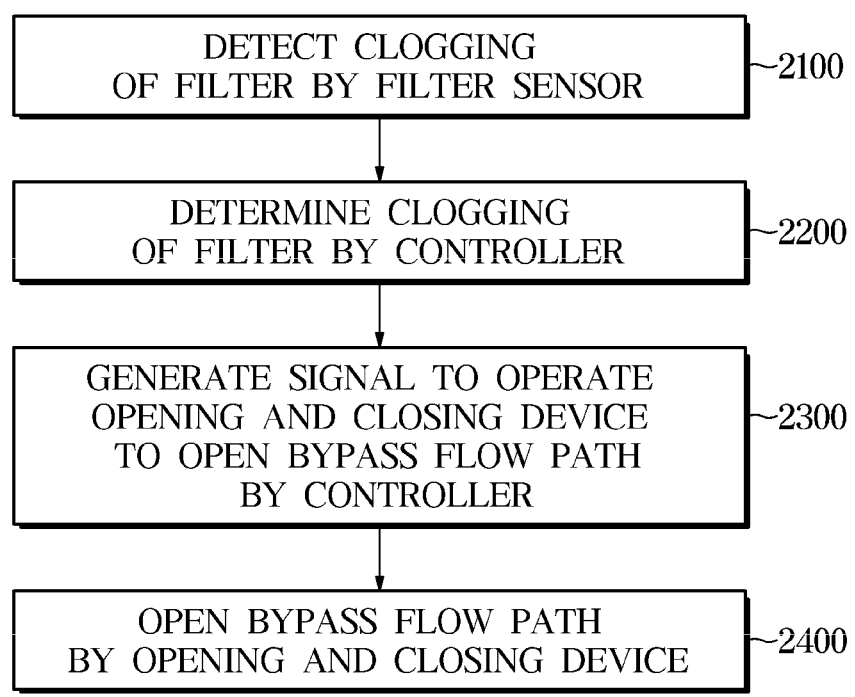
FIG. 18 shows a flowchart of a control method of a filter apparatus according to an embodiment of the disclosure.

FIG. 18 shows a flowchart of a control method of a filter apparatus according to an embodiment.

Referring to FIG. 18, the filter sensor 181 may detect that the filter 120 is clogged (operation 2100). The filter sensor 181 may detect that the second filter portion 122 of the filter 120 is clogged. The filter sensor 181 may obtain information about the amount of foreign substances collected in the filter 120. The controller 191 may receive information about clogging of the filter 120 from the filter sensor 181 that obtains information about the amount of foreign substances collected in the filter 120 and may detect whether the filter 120 is clogged.

The controller 191 may determine clogging of the filter 120 based on the detection that the amount of foreign substances collected in the filter 120 exceeds a preset amount (operation 2200). The controller 191 may determine that the flow of water passing through the filtering flow path 116 is not smooth based on the detection that the filter 120 is clogged.

The controller 191 may generate a signal for operating the opening and closing device 140 to open the bypass flow path 117 based on the detection of clogging of the filter 120

(operation 2300). Based on the detection of clogging of the filter 120, the controller 191 may control the opening and closing device 140 so that water flowing into the filter case 110 is discharged without passing through the filter 120.

When the filter 120 is blocked, the opening and closing device 140 may open the bypass flow path 117 (operation 2400). When the filter 120 is clogged, the opening and closing device 140 may open the connecting hole 118 of the filter case 110.

Figure 19:
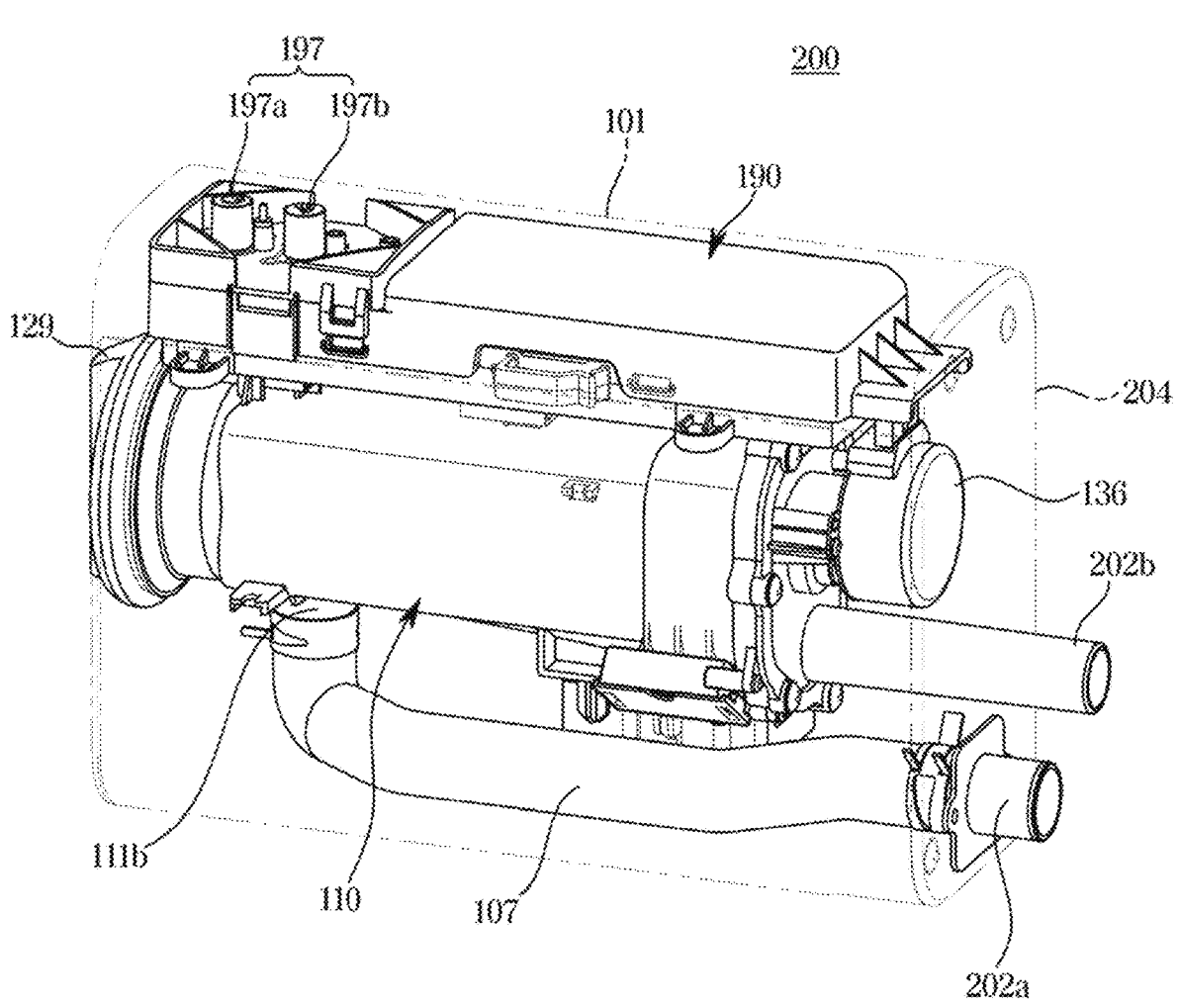
FIG. 19 shows a filter apparatus according to an embodiment of the disclosure.

FIG. 19 shows a filter apparatus according to an embodiment.

Referring to FIG. 19, a filter apparatus 200 according to an embodiment will be described. In describing the filter apparatus 200 shown in FIG. 19, the same reference numerals are assigned to the same components as those of the filter apparatus 100 shown in FIGS. 6 to 8, and detailed descriptions may be omitted.

Referring to FIG. 19, in the filter apparatus 200, the position of a housing inlet 202a and a housing outlet 202b may be provided differently from the position of the housing inlet 102a and the housing outlet 102b of the filter apparatus 100 shown in FIGS. 6 to 8.

Referring to FIG. 19, the housing inlet 202a may be located on the rear side of the filter apparatus 200. The housing inlet 202a may be located on the housing bracket 204. The housing inlet 102a of the filter apparatus 100 shown in FIGS. 6 to 8 is located in the housing body 102, however, the housing inlet 202a of the filter apparatus 200 shown in FIG. 19 may be located on the housing bracket 204. The housing inlet 202a may extend in substantially the same direction as the case inlet 112a of the filter case 110. The housing inlet 202a may be directly connected to the case inlet 112a.

The housing outlet 202b may be located on the rear side of the filter apparatus 200. The housing outlet 202b may be located on the housing bracket 204. The housing outlet 102b of the filter apparatus 100 shown in FIGS. 6 to 8 is located in the housing body 102, however, the housing outlet 202b of the filter apparatus 200 shown in FIG. 19 may be located on the housing bracket 204.

Although not shown, the filter apparatus can also combine a housing inlet 202a shown in FIG. 19 and a housing outlet 102b shown in FIGS. 6 to 8, and can also combine the housing inlet 102a shown in FIGS. 6 to 8 and the housing outlet 202b shown in FIG. 19.

A filter apparatus 100 according to an embodiment is the filter apparatus 100 positionable outside a washing machine and connectable to a drain device of the washing machine, the filter apparatus includes a filter case including a case inlet configured so that, with the filter apparatus connected to the drain device, water from the drain device is flowable through the case inlet into the filter case, and a case outlet configured so that, with the filter apparatus connected to the drain device, water in the filter case is flowable through the case outlet out of the filter case, a filter detachably mountable inside the filter case so that water flowing through the case inlet is flowable through a surface of the filter to filter foreign substances from the water, and then to the case outlet, a filter cleaning device configured to clean the surface of the filter, and a controller configured to control the filter cleaning device to clean the surface of the filter. According to the present disclosure, since the filter apparatus 100 is disposed outside the washing machines 10 and 10a, management of the filter apparatus 100 can be facilitated. According to the present disclosure, since the filter apparatus 100 includes the filter cleaning device 130, the lifespan of the filter 120 can be increased. According to the present disclosure, since the filter apparatus 100 includes a controller 191 for controlling the filter apparatus 100, independent control of the filter apparatus 100 is possible.

The filter cleaning device may include a cleaning driving device including a cleaning motor, and a cleaning member configured to be rotated in contact with the surface of the filter while the filter is mounted inside the filter case. The cleaning driving device may be configured to drive rotation of the cleaning member with power generated by the cleaning motor. According to the present disclosure, since the cleaning member 131 is provided to contact and rotate with the surface of the filter 120 on which foreign substances are filtered, the time required for the filter 120 to be clogged can be increased.

The cleaning member may be configured to, while the filter is mounted inside the filter case, transfer foreign substances filtered in a portion of the filter close to the case inlet to a portion of the filter close to the case outlet while the rotation of the cleaning member is driven by the cleaning driving device.

The filter case may include a remaining water guide inclined downward from the case outlet toward case inlet. According to the present disclosure, since the remaining water guide 119 is inclined downward from the case outlet 111b toward the case inlet 112a, residual water generated in the filter apparatus 100 can be easily treated.

The remaining water guide may be positioned below the filter while the filter is mounted inside the filter case.

The filter apparatus may further include a connecting hole arranged in the filter case to discharge water guided by the remaining water guide toward the case inlet, and a connecting door configured to open and close the connecting hole. According to the present disclosure, as the connecting door 141 selectively opens and closes the connecting hole 118, the residual water can be easily treated if necessary.

The filter apparatus may further include a filtering flow path passing through the filter while the filter is mounted inside the filter case, a bypass flow path bypassing the filter while the filter is mounted inside the filter case, a connecting hole formed to allow water from the bypass flow path to move to the case inlet and to allow water flowing through the case inlet to move to the bypass flow path, and a connecting door configured to open and close the connecting hole.

The controller may control the connecting door to open the connecting hole based on a determination that the filter is clogged. According to the present disclosure, when the filter 120 is clogged, since the connecting hole 118 is opened and water can be discharged through the bypass flow path 117, even if the filter 120 is clogged, the operation of the filter apparatus 100 can be prevented from being stopped.

The controller may control the connecting door to open the connecting hole based on a determination that an inflow of water through the case inlet is stopped. According to the present disclosure, the filter apparatus 100 may open the connecting hole 118 when residual water treatment is required, and since the connecting hole 118 is also a configuration for the above-described bypass flow path 117, a relatively simple configuration can be used to handle residual water and respond to clogging of the filter 120.

The filter apparatus may further include a circuitry positioned above the filter while the filter is mounted inside the filter case, and the controller may be arranged in the circuitry.

The filter apparatus may further include a user interface device positioned above the circuitry. According to the present disclosure, since the user interface device 197 is located above the circuitry 190 of the filter apparatus 100, user usability can be improved.

The filter case may include a case opening through which the filter is passable to be mounted inside the filter case, and which is positioned closer to the case outlet than the case inlet.

The cleaning driving device may be positioned closer to the case inlet than the case outlet. According to the present disclosure, by the arrangement of this configuration, since the flow direction of water passing through the filter apparatus 100 and the direction in which the filter cleaning device 130 transfers foreign substances of the filter 120 are identical, foreign substances of the filter 120 can be efficiently collected.

The filter apparatus may further include a handle detachably couplable to the filter. As the handle 129 is detachably mounted on the filter 120, management of the filter 120 can be facilitated.

A clothes treating apparatus according to an embodiment includes a washing machine including a washing machine housing, a tub inside the washing machine housing, and a drain device configured to discharge water from the tub to outside of the washing machine housing, and a filter apparatus disposed outside the washing machine housing and connected to the drain device. The filter apparatus includes a filter case including a case inlet configured so that water from the drain device is flowable through the case inlet into the filter case, a case outlet configured so that water in the filter case is flowable through the case outlet out of the filter case, and remaining water guide configured to be inclined downward from the case outlet toward the case inlet, a filter detachably mountable inside the filter case so that water flowing through the case inlet is flowable through a surface of the filter to filter foreign substances from the water, and then to the case outlet, and a circuitry including a controller configured to control the filter apparatus and a power supply part configured to receive power to power the filter apparatus. The remaining water guide is positioned below the filter while the filter is mounted inside the filter case.

The filter apparatus may further include a connecting hole 118 provided in the filter case to discharge water guided by the remaining water guide toward the case inlet and a connecting door 141 for opening and closing the connecting hole.

The filter apparatus may include a communication part 199 for communicating with the washing machine.

The controller may control the connecting door to open the connecting hole based on receiving drainage completion information from the washing machine through the communication part.

The filter apparatus may further include a cleaning member 131 rotatably in contact with a surface of the filter through which foreign substances are filtered and a cleaning motor 136 for driving the cleaning member.

The filter of the filter apparatus may be provided to filter foreign substances having a size smaller than that of foreign substances filterable by the washing machine.

According to a concept of the present disclosure, the clothes treating apparatus can be easily managed because the filter apparatus is disposed outside the washing machine.

According to the concept of the present disclosure, since the filter apparatus includes a filter cleaning device, the filter replacement cycle can be increased.

According to the concept of the present disclosure, since the filter apparatus and the clothes treating apparatus having the filter apparatus include the remaining water guide, it is possible to prevent contamination of the surroundings of the filter apparatus while managing the filter.

According to the concept of the present disclosure, since the filter apparatus includes a bypass flow path, water can be discharged from the filter apparatus even if a part of the filter is clogged.

According to the concept of the present disclosure, since the filter apparatus and the clothes treating apparatus having the filter apparatus include a bypass flow path, even if a part of the filter is clogged, the operation can be prevented from being stopped.

Effects that may be achieved by the disclosure are not limited to the above-mentioned effects, and other effects not mentioned will be clearly understood by one of ordinary skill in the technical field to which the disclosure belongs from the following descriptions.

So far, specific embodiments have been shown and described. However, the disclosure is not limited to these embodiments, it should be interpreted that various modifications may be made by one of ordinary skill in the technical art to which the disclosure belongs, without deviating from the gist of the technical concept of the disclosure, which is defined in the following claims.

What is claimed is:

1. A filter apparatus positionable outside a washing machine and connectable to a drain device of the washing machine, the filter apparatus comprising:

a filter case including:

a case inlet configured so that, with the filter apparatus connected to the drain device, water from the drain device is flowable through the case inlet into the filter case, a case outlet configured so that, with the filter apparatus connected to the drain device, water in the filter case is flowable through the case outlet out of the filter case, and a remaining water guide inclined downward from the case outlet toward the case inlet;

a filter detachably mountable inside the filter case so that water flowing through the case inlet is flowable through a surface of the filter to filter foreign substances from the water, and then to the case outlet;

a filter cleaner configured to clean the surface of the filter; and a controller configured to control the filter cleaner to clean the surface of the filter, wherein, while the filter is mounted inside the filter case, the remaining water guide is angled such that a distance between the filter and the remaining water guide increases along a length of the filter extending between the case outlet and the case inlet.

2. The filter apparatus of claim 1, wherein the filter cleaner includes:

a cleaning driving device including a cleaning motor, and a cleaner configured to be rotated in contact with the surface of the filter while the filter is mounted inside the filter case, wherein the cleaning driving device is configured to drive rotation of the cleaner with power generated by the cleaning motor.

3. The filter apparatus of claim 2, wherein the cleaner is configured to, while the filter is mounted inside the filter case, transfer foreign substances filtered in a portion of the filter close to the case inlet to a portion of the filter close to the case outlet while the rotation of the cleaner is driven by the cleaning driving device.

4. The filter apparatus of claim 1, wherein the remaining water guide is positioned below the filter while the filter is mounted inside the filter case.

5. The filter apparatus of claim 1, further comprising:

a connecting hole arranged in the filter case to discharge water guided by the remaining water guide toward the case inlet; and a connecting door configured to open and close the connecting hole.

6. The filter apparatus of claim 1, further comprising:

a filtering flow path passing through the filter while the filter is mounted inside the filter case;

a bypass flow path bypassing the filter while the filter is mounted inside the filter case;

a connecting hole formed to allow water from the bypass flow path to move to the case inlet and to allow water flowing through the case inlet to move to the bypass flow path; and a connecting door configured to open and close the connecting hole.

7. The filter apparatus of claim 6, wherein the controller controls the connecting door to open the connecting hole based on a determination that the filter is clogged.

8. The filter apparatus of claim 6, wherein the controller controls the connecting door to open the connecting hole based on a determination that an inflow of water through the case inlet is stopped.

9. The filter apparatus of claim 1, further comprising:

a circuitry positioned above the filter while the filter is mounted inside the filter case, wherein the controller is arranged in the circuitry.

10. The filter apparatus of claim 9, further comprising:

a user interface device positioned above the circuitry.

11. The filter apparatus of claim 1, wherein the filter case includes a case opening through which the filter is passable to be mounted inside the filter case, and which is positioned closer to the case outlet than the case inlet.

12. The filter apparatus of claim 2, wherein the cleaning driving device is positioned closer to the case inlet than the case outlet.

13. The filter apparatus of claim 1, further comprising:

a handle detachably couplable to the filter.

14. The filter apparatus of claim 1, wherein the surface of the filter is configured to filter foreign substances having a size of 5 mm or less from the water flowing through the surface of the filter.

15. A clothes treating apparatus comprising:

a washing machine including a washing machine housing, a tub inside the washing machine housing, and a drain device configured to discharge water from the tub to outside of the washing machine housing; and a filter apparatus disposed outside the washing machine housing and connected to the drain device, the filter apparatus including:

a filter case including:

a case inlet configured so that water from the drain device is flowable through the case inlet into the filter case, a case outlet configured so that water in the filter case is flowable through the case outlet out of the filter case, and a remaining water guide configured to be inclined downward from the case outlet toward the case inlet;

a filter detachably mountable inside the filter case so that water flowing through the case inlet is flowable through a surface of the filter to filter foreign substances from the water, and then to the case outlet; and a circuitry including:

a controller configured to control the filter apparatus, and a power supply part configured to receive power to power the filter apparatus, wherein the remaining water guide is positioned below the filter while the filter is mounted inside the filter case, and wherein, while the filter is mounted inside the filter case, the remaining water guide is angled such that a distance between the filter and the remaining water guide increases along a length of the filter extending between the case outlet and the case inlet.

\* \* \* \* \*